(12) United States Patent
Yabe

(10) Patent No.: US 10,481,952 B2
(45) Date of Patent: Nov. 19, 2019

(54) NON-TRANSITORY COMPUTER-READABLE MEDIUM, SYSTEM, AND INFORMATION PROCESSING METHOD

(71) Applicant: CANON KABUSHIKI KAISHA, Tokyo (JP)

(72) Inventor: Kenta Yabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 15/783,061

(22) Filed: Oct. 13, 2017

(65) Prior Publication Data

US 2018/0113745 A1 Apr. 26, 2018

(30) Foreign Application Priority Data

Oct. 25, 2016 (JP) .................................. 2016-208847

(51) Int. Cl.
```
G06F 9/44      (2018.01)
G06F 9/50      (2006.01)
G06F 9/48      (2006.01)
G06F 9/54      (2006.01)
G06F 11/30     (2006.01)
G06F 11/34     (2006.01)
G06F 11/07     (2006.01)
```
(52) U.S. Cl.
CPC ............ *G06F 9/5038* (2013.01); *G06F 9/485* (2013.01); *G06F 9/4812* (2013.01); *G06F 9/4837* (2013.01); *G06F 9/4881* (2013.01); *G06F 9/5044* (2013.01); *G06F 9/5072* (2013.01); *G06F 9/5088* (2013.01); *G06F 9/542* (2013.01); *G06F 11/0757* (2013.01); *G06F 11/302* (2013.01); *G06F 11/3065* (2013.01); *G06F 11/3419* (2013.01)

(58) Field of Classification Search
CPC ...................................................... G06F 9/5038
USPC .......................................................... 717/124
See application file for complete search history.

(56) References Cited

U.S. PATENT DOCUMENTS

| | | |
|---|---|---|
| 7,145,688 B2 | 12/2006 | Minagawa |
| 8,949,653 B1 | 2/2015 | Kayan et al. |
| 2004/0153866 A1* | 8/2004 | Guimbellot ............... H04L 1/22 714/4.11 |

(Continued)

FOREIGN PATENT DOCUMENTS

| | | |
|---|---|---|
| EP | 2434401 A1 | 5/2010 |
| JP | 2004038759 A | 2/2004 |
| WO | 2012033773 A2 | 3/2012 |

OTHER PUBLICATIONS

Quora.com, "What is a scripting language? In what are they important?", May 2015, pp. 1-4, https://www.quora.com/What-is-a-scripting-language-In-what-are-they-important (Year: 2015).*

(Continued)

*Primary Examiner* — Wei Y Zhen
*Assistant Examiner* — Lanny N Ung
(74) *Attorney, Agent, or Firm* — Venable LLP

(57) ABSTRACT

In the case where an indication that a limit of an event-driven computing service will be reached is detected during the execution of asynchronous process code, the same asynchronous process code is started in an execution environment having higher specifications from the asynchronous process code currently being executed, and processing is continued.

14 Claims, 16 Drawing Sheets

(56) References Cited

U.S. PATENT DOCUMENTS

2004/0255296 A1* 12/2004 Schmidt ............... G06F 9/4887
718/100
2008/0155387 A1 6/2008 Yabe

OTHER PUBLICATIONS

European Search Report issued in corresponding European Application No. 17001637.2 dated Mar. 16, 2018.
U.S. Copending, unpublished U.S. Appl. No. 15/783,050, filed Oct. 13, 2017 to Tomonori Minagawa.

* cited by examiner

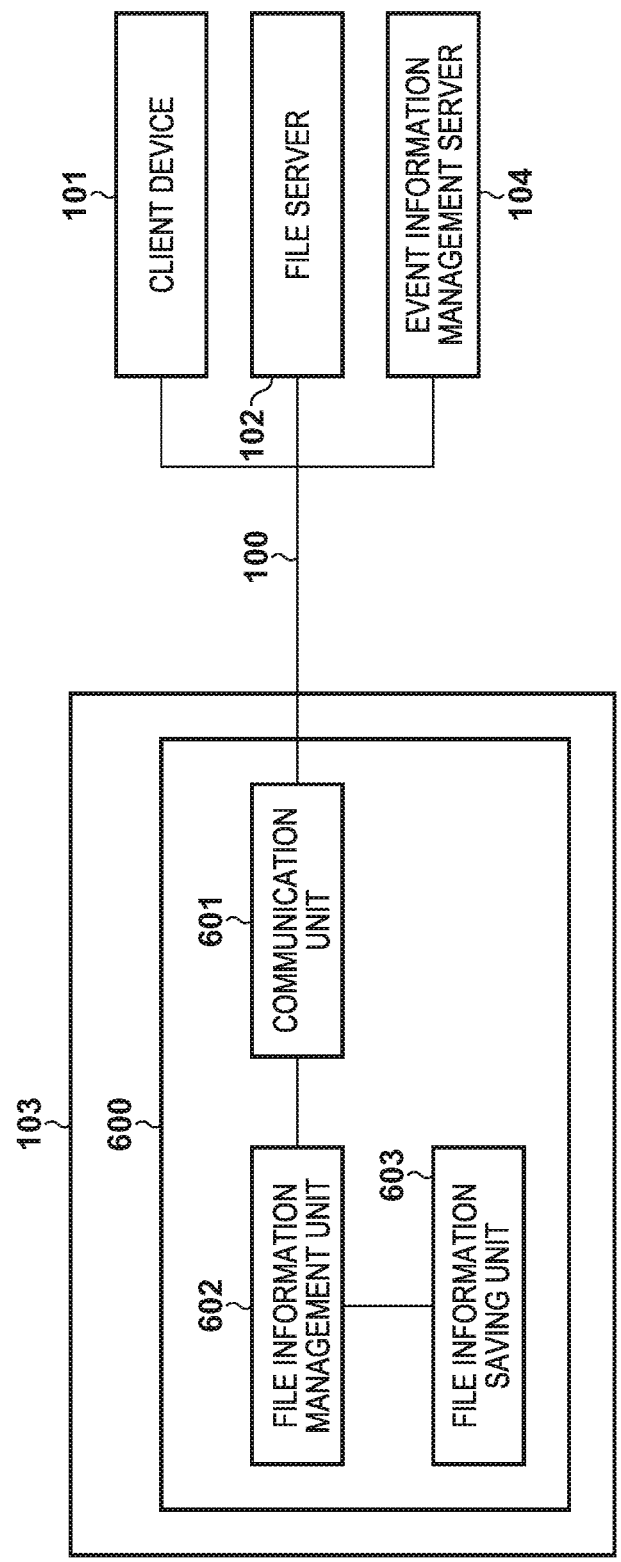

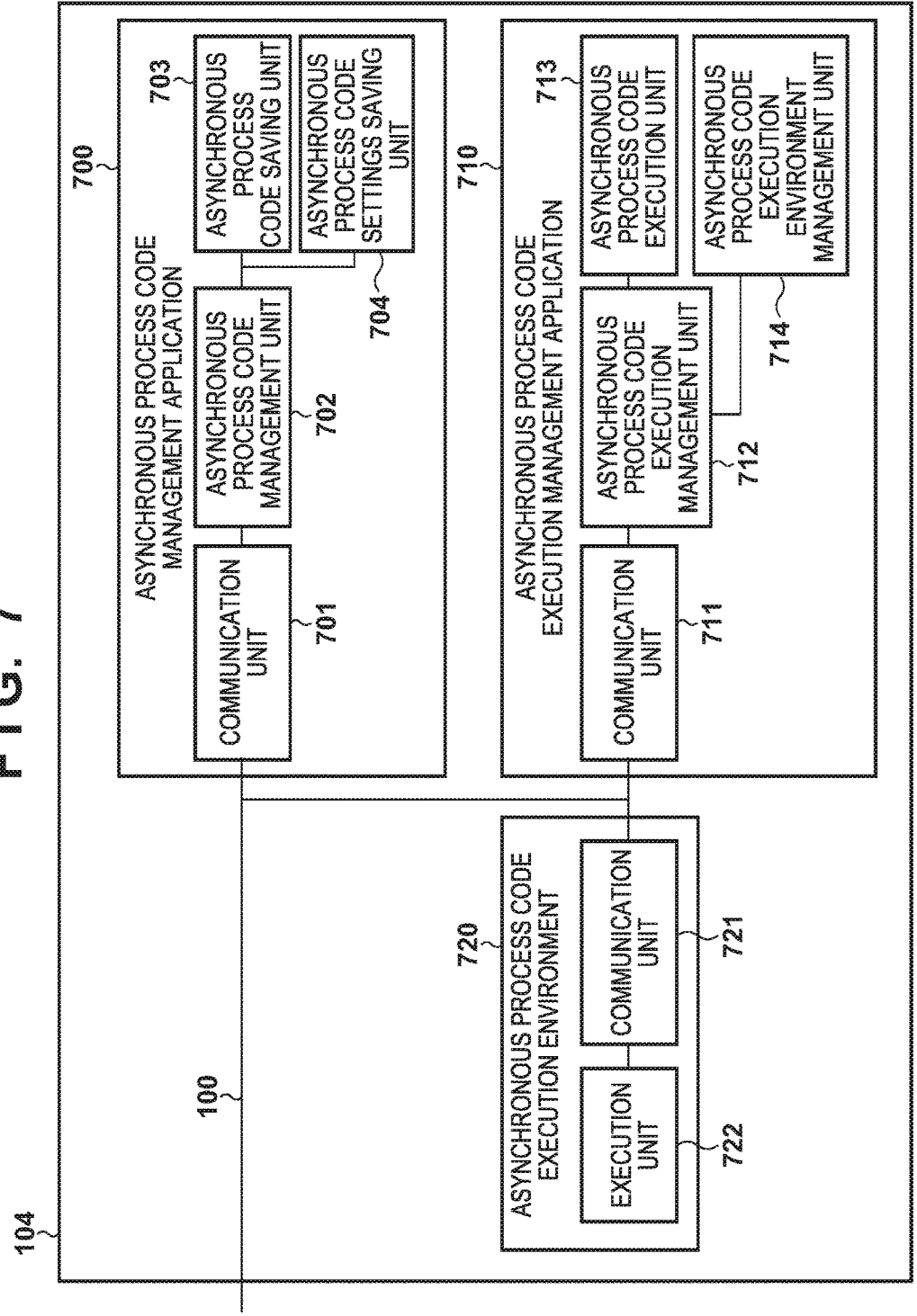

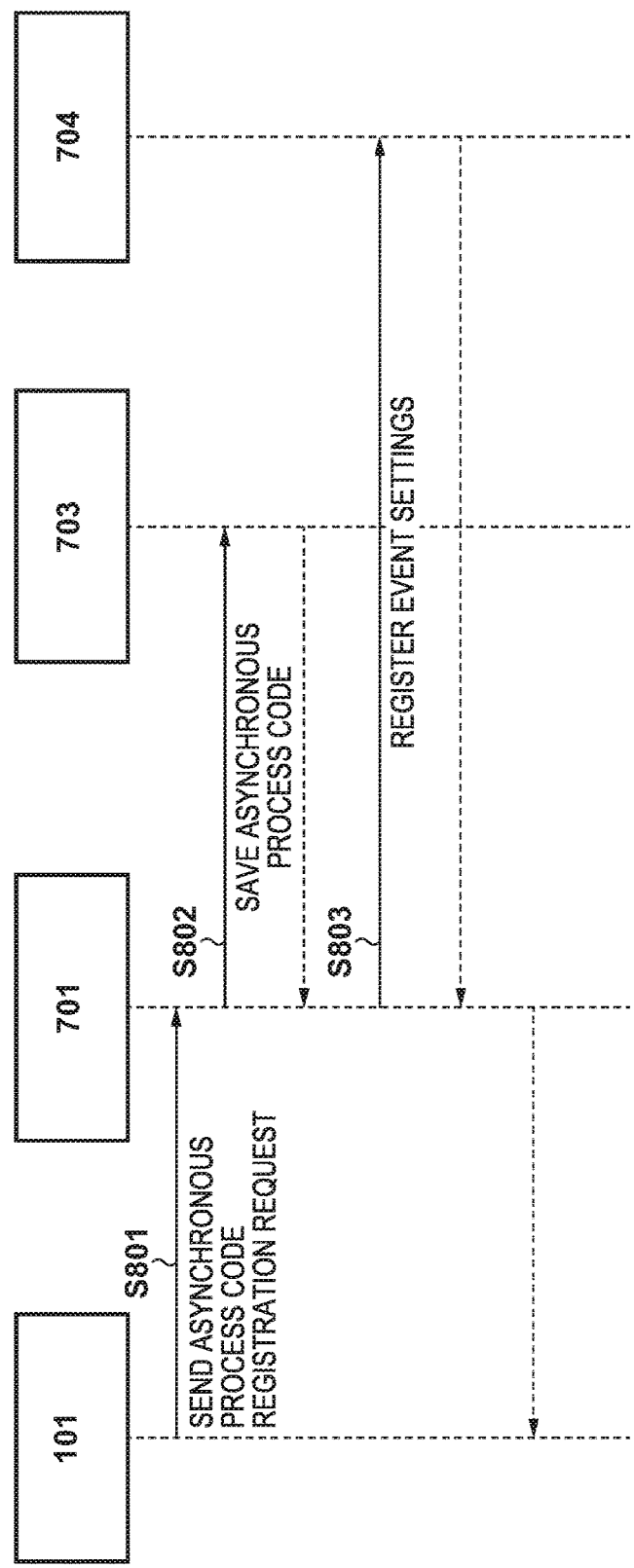

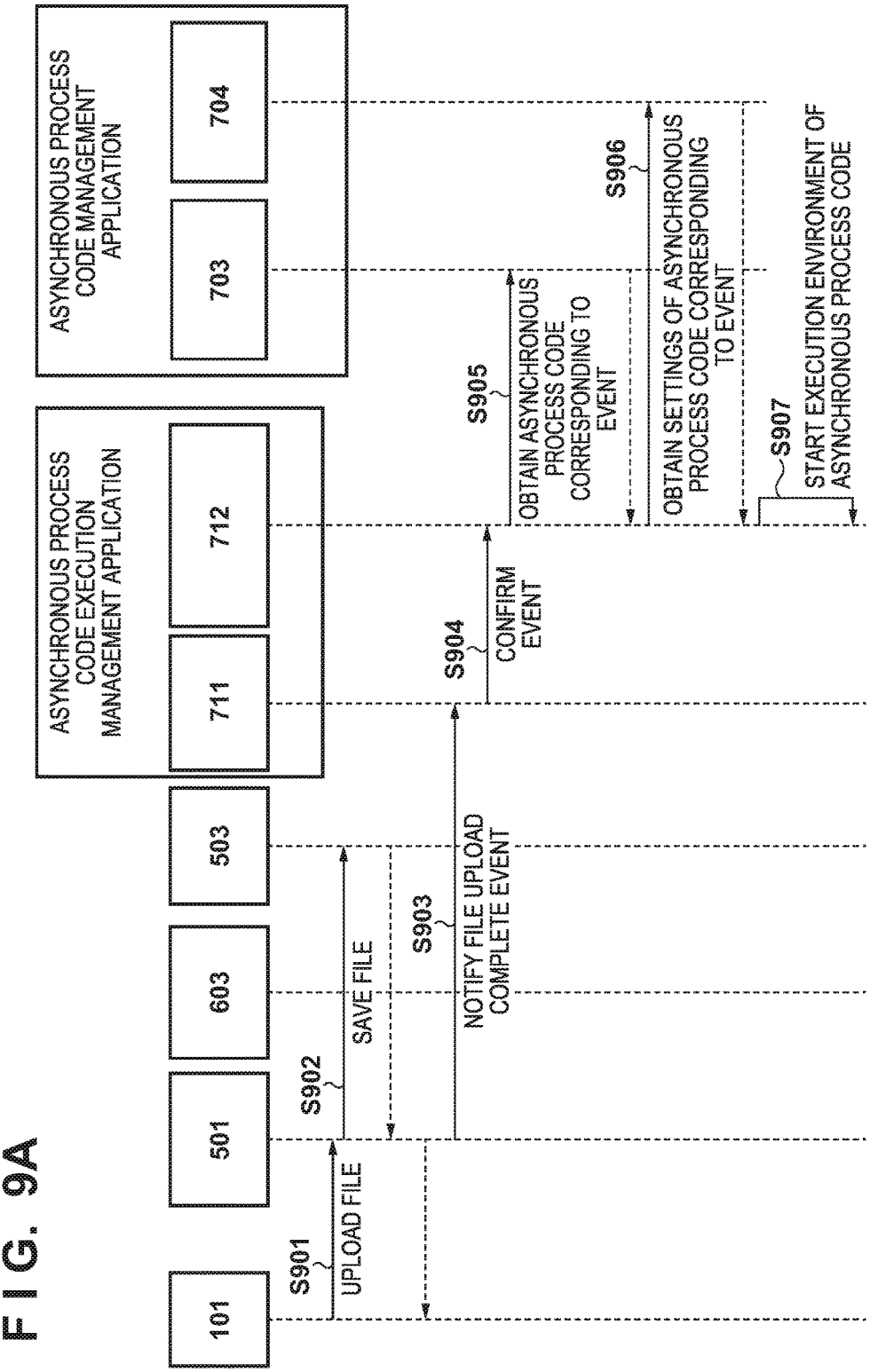

F I G. 12

```
...
MAIN CLASS (ASYNCHRONOUS PROCESS CODE ID, EXECUTION ENVIRONMENT ID, FILE PATH)
{
    EXECUTION PERMISSION TIME = 240;                                    ~-1201
    START TIME MONITORING TIMER CLASS.start();                          ~-1202
    FILE ATTRIBUTE INFORMATION REGISTRATION CLASS (FILE PATH).start();  ~-1203
    while()
    {
        if (STARTING TIME > EXECUTION PERMISSION TIME)
        {
            FILE ATTRIBUTE INFORMATION REGISTRATION CLASS.stop();       ~-1204
            HIGHER-LEVEL ASYNCHRONOUS PROCESS STARTING CLASS.
            launch(ASYNCHRONOUS PROCESS CODE ID, ENVIRONMENT ID);
        }
    }
}
FILE ATTRIBUTE INFORMATION REGISTRATION CLASS ()
{
    void start(FILE PATH)
    {
        ...
        OBTAIN TARGET FILE FROM FILE SERVER (FILE PATH);                ~-1203
        REGISTER FILE ATTRIBUTE INFORMATION (FILE);
        ...
    }
    void stop()
    {
        ...                                                              ~-1205
        INTERRUPT PROCESS OF REGISTERING FILE ATTRIBUTE INFORMATION();
        ...
    }
}                                                                        1206
HIGHER-LEVEL ASYNCHRONOUS PROCESS STARTING CLASS()
{
    ...
    void launch(ASYNCHRONOUS PROCESS CODE ID, EXECUTION ENVIRONMENT ID+1);
    ...
}
...
```

FIG. 14

```
...
MAIN CLASS (ASYNCHRONOUS PROCESS CODE ID, EXECUTION ENVIRONMENT ID, FILE PATH)
{
    var STARTING LIMIT NUMBER = STARTING LIMIT NUMBER.get();          ~--1401
    var CURRENT EXECUTION NUMBER = EXECUTION NUMBER.get();            ~--1402    1403
    if(CURRENT EXECUTION NUMBER < STARTING LIMIT NUMBER)
    {
        FILE ATTRIBUTE INFORMATION REGISTRATION CLASS.stop();
        HIGHER-LEVEL ASYNCHRONOUS PROCESS STARTING CLASS.
        launch(ASYNCHRONOUS PROCESS CODE ID, ENVIRONMENT ID);
    }
    FILE ATTRIBUTE INFORMATION REGISTRATION CLASS (FILE PATH).start();   ~--1404
}
FILE ATTRIBUTE INFORMATION REGISTRATION CLASS()
{
    void start(FILE PATH)
    {
        ...
        OBTAIN TARGET FILE FROM FILE SERVER (FILE PATH);
        REGISTER FILE ATTRIBUTE INFORMATION (FILE);
        ...
    }
    void stop()
    {
        ...
        INTERRUPT PROCESS OF REGISTERING FILE ATTRIBUTE INFORMATION();
        ...
    }
}
HIGHER-LEVEL ASYNCHRONOUS PROCESS STARTING CLASS()
{
    ...
    void launch(ASYNCHRONOUS PROCESS CODE ID, EXECUTION ENVIRONMENT ID+1);
    ...
}
...
```

NON-TRANSITORY COMPUTER-READABLE MEDIUM, SYSTEM, AND INFORMATION PROCESSING METHOD

BACKGROUND OF THE INVENTION

Field of the Invention

The invention relates to a non-transitory computer-readable medium, a system, and an information processing method, and particularly relates to an efficient resource control method in an event-driven computing service of a cloud service.

Description of the Related Art

Various types of cloud computing services have become available in recent years. Amazon Web Service (abbreviated as "AWS" hereinafter), Google Cloud Platform, and Microsoft Azure can be given as examples of such services. These services have become widespread by providing computing resources such as virtual machines and storage as services that are billed by the hour in accordance with the specifications, storage, and so on used. By using such a service, a user can flexibly create information processing systems such as web systems at low cost, without having to prepare the necessary physical resources him/herself. Collecting log information, operation information, and so on of devices and applications from various devices, computer terminals, and mobile terminals connected to a network, saving that information in storage, and managing the information in a database can be given as a usage example of such a cloud computing service. Here, a record is created each time information such as a collection of files is uploaded in order to manage the filenames thereof, the location in the storage where the information is saved, and so on.

For example, Japanese Patent Laid-Open No. 2004-38759 discloses a technique called an "event-driven script". According to this technique, in the case where specific data has been updated, a pre-registered script is launched in accordance with the update event. Cloud computing services also provide services that execute low-load processes in response to events occurring with respect to specific computing resources (called "event-driven computing services" hereinafter). AWS Lambda, Google Cloud Functions, and Microsoft Azure Functions are examples. In these services, program code for implementing a desired process for a cloud computing service is registered in advance having designated specs such as a CPU, memory, and so on of a virtual machine that executes the program code. The registered program code is associated with computing resources and a specific event that occurs with respect to those computing resources.

Thus far, to implement the same kind of processing as realized by an event-driven computing service, it has been necessary to provide an application for detecting an event occurring with respect to computing resources, an application for executing desired processing, and so on, and also to construct and manage the infrastructure for running those applications. However, the above-described event-driven computing services have made it possible for users of a cloud computing service to focus only on developing desired processes. Furthermore, with event-driven computing services, services can be provided while billing for each hour the registered program code is executed, which has made developing applications having the above-described configurations easier from the standpoint of infrastructure costs as well.

In current event-driven computing services as represented by AWS Lambda, there are limitations when executing program code that is executed in response to the occurrence of an event. Specifically, if the program code does not finish processing within an amount of time specified by the event-driven computing service, the process will time out and end in an error. In the case where program code ends in an error a set amount of consecutive times, the event-driven computing service will stop executing the program code even if an event occurs with respect to the corresponding computing resources.

For example, assume that program code for processing a file uploaded to predetermined storage in response to an event of the file upload finishing is registered in an event-driven computing service. At this time, if the uploaded file is large, there may be cases, depending on the specs of the virtual machine executing the program code, where the processing will not be completed within the required amount of time. In other words, when data that does not match the specs of the virtual machine assumed as the environment for executing the program code is uploaded, it is possible that timeouts will occur repeatedly and the processing will not be executed.

SUMMARY OF THE INVENTION

The invention provides a non-transitory computer-readable medium, a system, and an information processing method that suppress failures in an event-driven computing service.

The invention has the following configuration.

That is, according to a first aspect of the invention, there is provided a non-transitory computer-readable medium storing a program therein executed by a computer constituting a system in accordance with a system event and computing resources designated during registration, the program causing a computer to function as: a processing unit configured to process data managed by the system; and a starting unit configured to interrupt the processing carried out by the processing unit and starting another program registered in the system in accordance with a result of monitoring an amount of time taken to execute the program.

According to a second aspect of the invention, there is provided a system that provides a service that in response to a system event automatically executes a script registered in advance with computing resources designated for the script, the system comprising: a detection unit configured to detect the system event; a processing unit configured to process data by executing a script corresponding to the detected system event; a monitoring unit configured to monitor an amount of time taken to execute the script; and an execution unit configured to interrupt the processing carried out by the processing unit and executing another script registered in the system in accordance with a result of the monitoring carried out by the monitoring unit, wherein the data being processed by the processing unit is processed as a result of the other script being executed.

According to a third aspect of the invention, there is provided an information processing method in a system that provides a service that in response to a system event automatically executes a script registered in advance with computing resources designated for the script, the method comprising: detecting the system event; processing data by executing a script corresponding to the detected system event; monitoring an amount of time taken to execute the script; and interrupting the processing of the data and executing another script registered in the system in accordance with a result of the monitoring, wherein the data being processed is processed as a result of the other script being executed.

According to the invention, in an event-driven computing service, failures in the event-driven computing service can be suppressed.

Further features of the present invention will become apparent from the following description of exemplary embodiments (with reference to the attached drawings).

BRIEF DESCRIPTION OF THE DRAWINGS

FIG. 6 is a diagram illustrating the software configuration of a file information server 103.

FIG. 7 is a diagram illustrating the software configuration of an event information management server 104.

FIG. 8 is a sequence chart illustrating a series of processes for registering asynchronous process code.

FIGS. 9A and 9B are sequence charts illustrating a series of processes executed by the asynchronous process code.

FIG. 12 illustrates pseudo-code of asynchronous process code that starts asynchronous process code in a different execution environment.

FIG. 14 illustrates pseudo-code of asynchronous process code that launches asynchronous process code in a different execution environment.

DESCRIPTION OF THE EMBODIMENTS

First Embodiment

System Configuration

Figure 1:
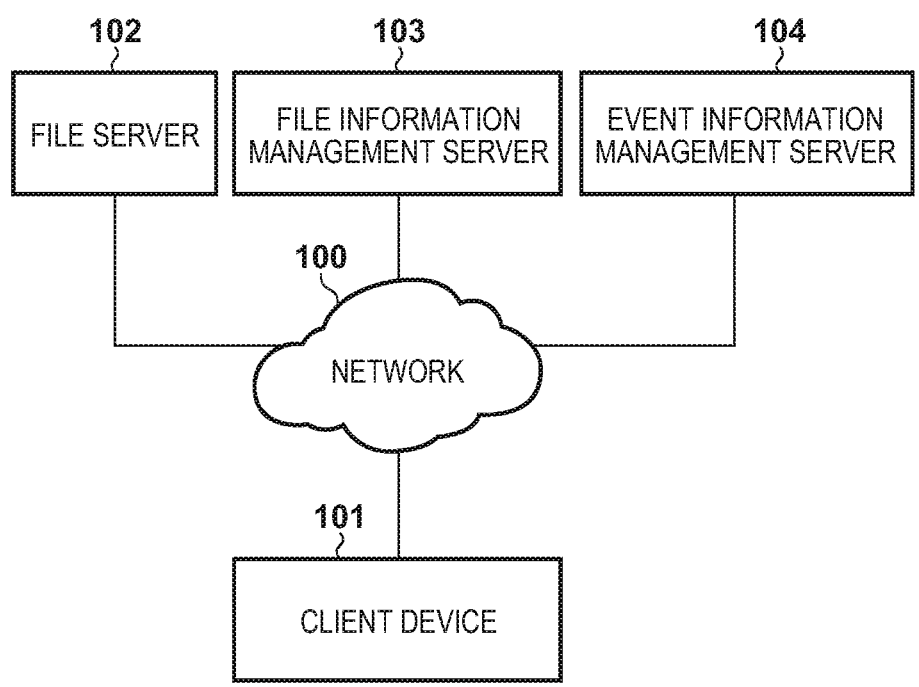
FIG. 1 is a diagram illustrating the overall configuration of a system.

Hereinafter, embodiments of the present invention will be described with reference to the drawings. FIG. 1 is a block diagram illustrating the overall configuration of a system according to the invention. A network 100 is a network connecting the constituent elements in the block diagram of FIG. 1, namely a client device 101, a file server 102, a file information management server 103, and an event information management server 104. The client device and servers, administrator devices, and so on may also be referred to as "information processing apparatuses" or "computers". The system illustrated in FIG. 1 may be referred to as a "cloud system" or an "information processing system".

The network 100 is a framework through which the constituent elements communicate with each other. In the invention, the client device 101 will be described as being connected to the other constituent elements over the internet. The other constituent elements, meanwhile, may be connected over an intranet, the internet, or another network system. Of the constituent elements illustrated in the block diagram of FIG. 1, the client device 101 is mutually connected to the file server 102 and the file information management server 103 over the network 100. While this embodiment assumes the client device 101 is a personal computer ("PC" hereinafter), the client device 101 may be any type of terminal having a function for communicating over the network 100. The file server 102 is a server device that receives and saves actual files sent from the client device 101. The file server 102 has a function for saving files in a variety of formats sent from the client device 101. The file information management server 103 is a server device that saves attribute information of files sent from the client device 101 in association with information indicating the location where the file is stored in the file server 102 (a URL).

The event information management server 104 is a server device that manages and executes program code in an event-driven computing service. A user of the event-driven computing service registers program code and an event to occur in the file server 102 for executing that program code in association with each other in the event information management server 104. "Event" refers to an operation made by the client device 101 or another constituent element illustrated in FIG. 1 on a file saved in the file server 102, such as a file being uploaded to a predetermined path in the file server 102, a file saved in a predetermined path in the file server 102 being updated, and so on. Environment information of a virtual machine executing the program code is also registered in association with the code. This refers specifically to the specifications of the CPU, RAM, and so on operating in the virtual machine. By doing so, when an event occurs in the file server 102, the event information management server 104 executes predetermined program code associated with the event asynchronously from the process executed in the file server 102. Hereinafter, program code executed by the event information management server 104 in response to an event occurring in the file server 102 will be referred to as "asynchronous process code". Additionally, the "event" according to this embodiment will be referred to as a "system event". The type of an event and the asynchronous process code are designated and associated when event information is registered, for example. The asynchronous process code is executed using the computing resources of the event information management server 104 executing the asynchronous process code. The asynchronous process code is implemented using script such as Javascript®, for example.

Terminal and Server Hardware Configuration

Figure 2:
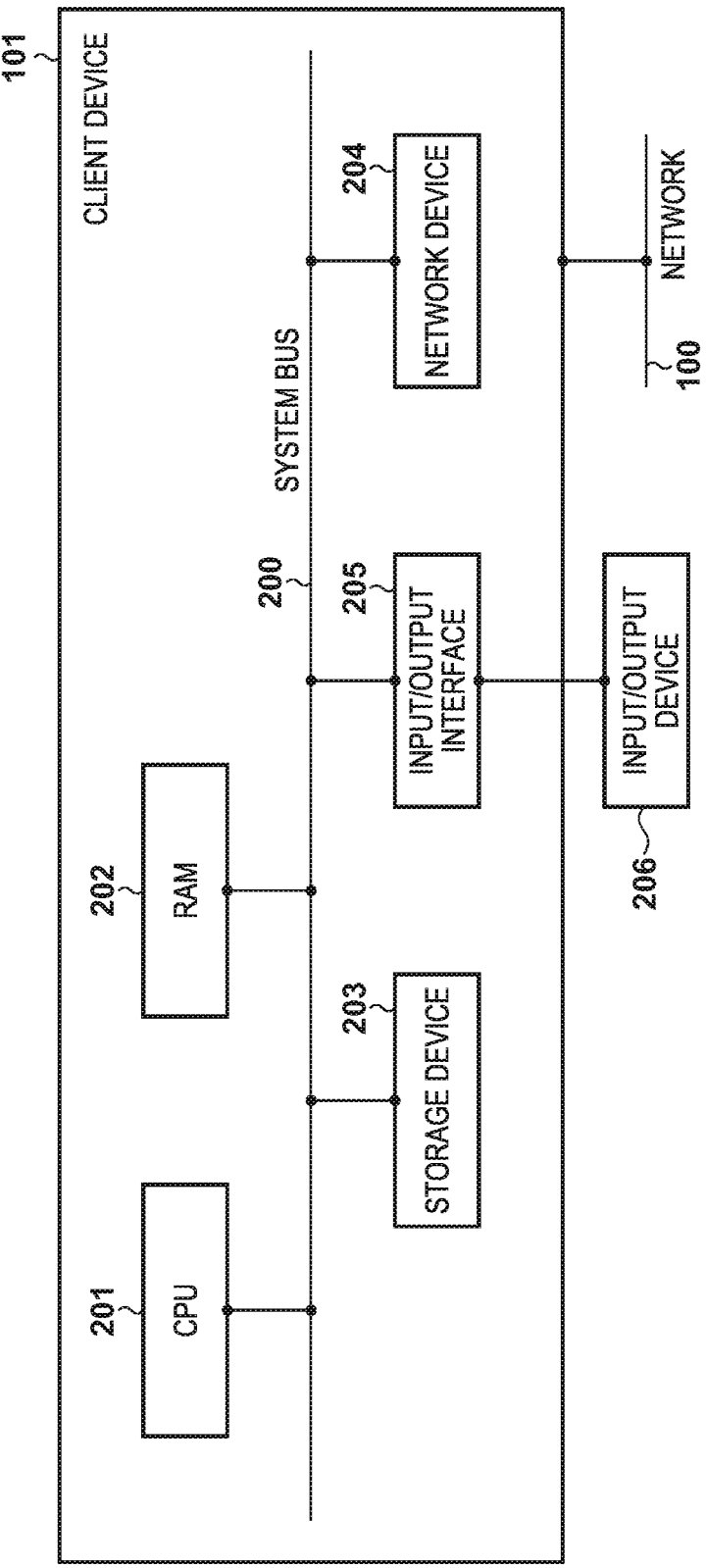
FIG. 2 is a diagram illustrating the hardware configuration of a client device 101.

FIG. 2 is a block diagram illustrating an example of the hardware configuration of the client device 101 illustrated in FIG. 1. A system bus 200 is a bus connecting the hardware elements constituting the client device 101 to each other. Unless specified otherwise, this embodiment assumes that the system bus 200 conveys control commands from a CPU 201 to the various hardware elements connected to the system bus 200. The CPU 201 executes programs loaded from RAM 202 and a storage device 203, and directly or indirectly controls the hardware elements of the client device 101 that are connected by the system bus 200 in order to realize the invention according to this embodiment. The RAM 202 is a temporary memory region used as a work region for the CPU 201 to operate. The storage device 203 is an external storage device, such as an HDD, that stores an OS, which is basic software, as well as other software modules. A network device 204 is hardware that connects to the network 100 to communicate with other devices. An input/output interface 205 is an interface for connecting to an input/output device 206. The input/output interface 205 includes, for example, PS2, Universal Serial Bus (USB), an analog or digital display interface, and so on. The input/output device 206 is a device that connects to the client device 101 via the input/output interface 205 and inputs/outputs information. The input/output device 206 is a display, a keyboard, a mouse, or the like, for example.

Figure 3:
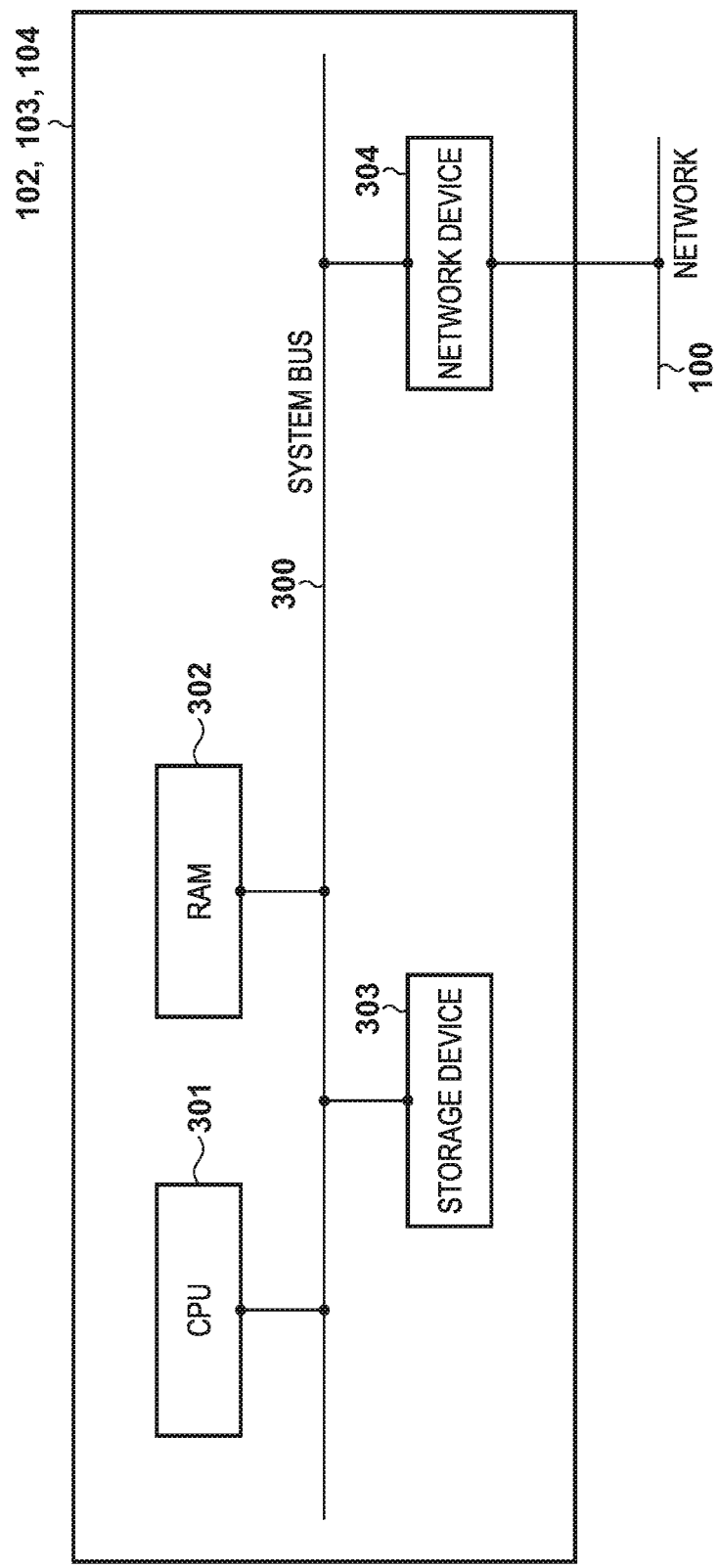
FIG. 3 is a diagram illustrating the hardware configuration of each of servers 102, 103, and 104.

FIG. 3 is a block diagram illustrating an example of the hardware configuration of the file server 102, the file information management server 103, and the event information management server 104 illustrated in FIG. 1. A system bus 300 is a bus connecting the hardware elements constituting the file server 102, the file information management server 103, or the event information management server 104 to each other. Unless specified otherwise, this embodiment assumes that the system bus 300 conveys control commands from a CPU 301 to the various hardware elements connected to the system bus 300. The CPU 301 executes programs loaded from RAM 302 and a storage device 303, and directly or indirectly controls the hardware elements of the client device 101 that are connected by the system bus 300 in order to realize the invention according to this embodiment. The RAM 302 is a temporary memory region used as a work region for the CPU 301 to operate. The storage device 303 is an external storage device, such as an HDD, that stores an OS, which is basic software, as well as other software modules. A network device 304 is hardware that connects to the network 100 to communicate with other devices. It is assumed that the file server 102, the file information management server 103, and the event information management server 104 illustrated in FIG. 1 are provided as a cloud computing service, and that the hardware elements illustrated in FIG. 3 are realized as application software by virtual machine software and behave in the same manner as physical hardware elements.

Client Software

Figure 4:
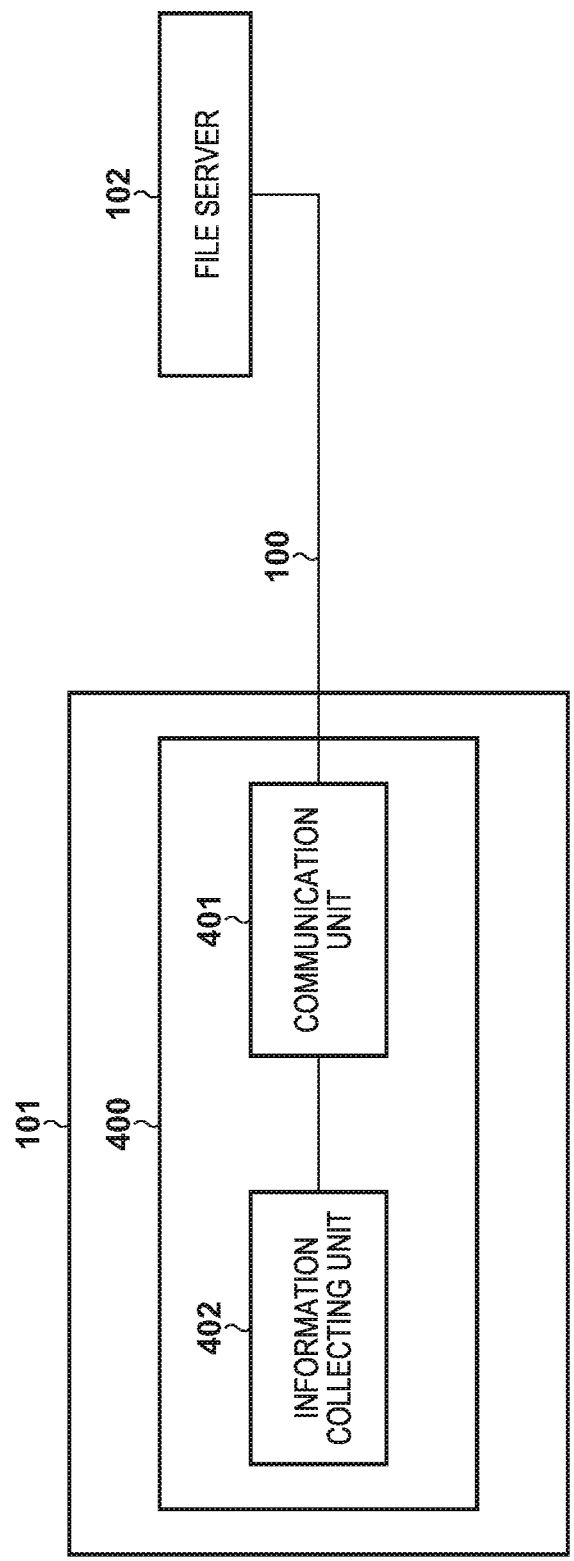
FIG. 4 is a diagram illustrating the software configuration of the client device 101.

FIG. 4 is a block diagram illustrating an example of the software configuration of a client device information transmission application 400 that runs on the client device 101 according to this embodiment. The client device information transmission application 400 is stored in the storage device 203 of the client device 101 and is executed by the CPU 201. The client device information transmission application 400 is constituted of a communication unit 401 and an information collecting unit 402. The communication unit 401 communicates with the file server 102 via the network device 204. The information collecting unit 402 collects client device information generated by the client device 101 and saves that information as a file in the storage device 203. Specifically, the information collecting unit 402 sequentially saves hardware log information and the like output by the client device 101 as files in the storage device 203. The client device information transmission application 400 sends the client device information to the file server 102 via the communication unit 401.

File Server Software

Figure 5:
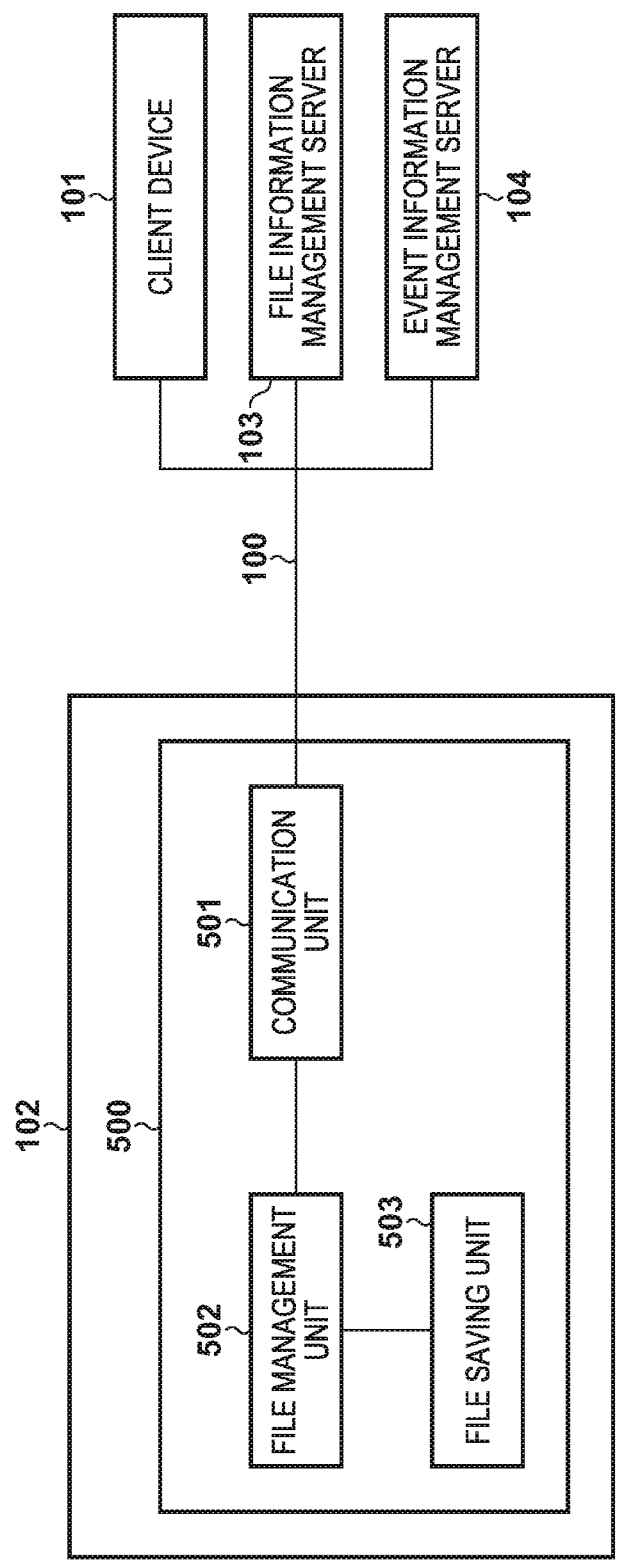
FIG. 5 is a diagram illustrating the software configuration of a file server 102.

FIG. 5 is a block diagram illustrating an example of the software configuration of a file management application 500 that runs on the file server 102 according to this embodiment. The file management application 500 is stored in the storage device 303 of the file server 102 and executed by the CPU 301. The file management application 500 is constituted of a communication unit 501, a file management unit 502, and a file saving unit 503. The communication unit 501 communicates with the client device 101, the file server 102, the file information management server 103, and the event information management server 104 via the network device 304. The file management unit 502 receives a request from the client device 101 and the event information management server 104 via the communication unit 501. The file management unit 502 also sends events to the event information management server 104 via the communication unit 501. The file saving unit 503 saves the actual file received from the client device 101 in accordance with an instruction from the file management unit 502. The file saving unit 503 also sends actual files in response to requests from the constituent elements of the invention according to the embodiment illustrated in FIG. 1, in accordance with instructions from the file management unit 502. The following file management table (Table 1) shows an example of data managed by the file saving unit 503 for actual files.

TABLE 1

File Management Table

| ID | SAVE PATH | FILENAME | FILE SIZE | FILE DATA |
| --- | --- | --- | --- | --- |
| 1 | logdata/client001 | 201601.log | 1024 KB | <binary data> |
| 2 | logdata/client001 | 201602.log | 2048 KB | <binary data> |
| 3 | logdata/client002 | 201605.log | 512 KB | <binary data> |

In Table 1, the "ID" column is a column that holds a value by which the file management application 500 uniquely identifies the files saved in the file server 102. The "save path" column is a column that holds path information of the folder in which the file is saved in the file server 102. The "filename" column is a column that holds a value of the name of the file saved in the file server 102. The "file size" column is a column that holds a value of the size of file saved in the file server 102. The "file data" column is a column that holds binary data of the actual file saved in the file server 102.

File Information Management Server Software

FIG. 6 is a block diagram illustrating an example of the software configuration of a file information management application 600 that runs on the file information management server 103 according to this embodiment. The file information management application 600 is stored in the storage device 303 of the file information management server 103 and executed by the CPU 301. The file information management application 600 is constituted of a communication unit 601, a file information management unit 602, and a file information saving unit 603. The communication unit 601 communicates with the event information management server 104 via the network device 304. The file information management unit 602 receives a request from the event information management server 104 via the communication unit 601. The file information saving unit 603 saves various types of attribute information extracted from the actual file received from the file server 102, in accordance with an instruction from the file information management unit 602. The attribute information is saved in the file information saving unit 603 as a result of the execution of asynchronous process code by the event information management server 104, which will be described later. The following file information management table (Table 2) shows an example of data managed by the file information saving unit 603 for the attribute information of files.

TABLE 2

File Information Management Table

| ID | FILE SERVER ID | ... | [ATTRIBUTES] FULL-TEXT SEARCH INDEX |
|---|---|---|---|
| A | 1 | ... | <text data> |
| B | 2 | | <text data> |
| C | 3 | | <text data> |

In Table 2, the "ID" column is a column that holds a value by which the file information management application 600 uniquely identifies the file attribute information saved in the file information management server 103. The "file server ID" column is a column holding a value from the "ID" column of the file management table (Table 1) corresponding to the actual file from which the attribute information was extracted. The "attributes" column is a column that holds the attribute information extracted from the actual files. Various types of information can be given as examples of the specific values held in the "attributes" column, depending on the purpose of the application. For example, index text data for searching the full text extracted from a file can be given as an example. However, the values of the extracted attribute information are not particularly limited in this embodiment.

Event Information Management Server Software

FIG. 7 is a block diagram illustrating an example of the software configurations of respective applications that run on the event information management server 104 according to this embodiment. In the event information management server 104, an asynchronous process code management application 700, an asynchronous process code execution management application 710, and an asynchronous process code execution environment 720 are stored in the storage device 303 and executed by the CPU 301. The asynchronous process code management application 700 saves asynchronous process code executed by the event information management server 104 and manages execution settings of the asynchronous process code. The asynchronous process code management application 700 is constituted of a communication unit 701, an asynchronous process code management unit 702, an asynchronous process code saving unit 703, and an asynchronous process code settings saving unit 704. The communication unit 701 communicates with the client device 101, the file server 102, the file information management server 103, and the asynchronous process code execution management application 710 via the network device 304. The asynchronous process code management unit 702 receives an asynchronous process code registration request from the client device 101 via the communication unit 701. The asynchronous process code management unit 702 also receives an asynchronous process code request from the asynchronous process code execution management application 710. The asynchronous process code saving unit 703 saves the asynchronous process code received from the client device 101 in accordance with instructions from the asynchronous process code management unit 702. Additionally, the asynchronous process code saving unit 703 sends asynchronous process code to the asynchronous process code execution management application 710 in accordance with instructions from the asynchronous process code management unit 702. The following asynchronous process code management table (Table 3) shows an example of data for the asynchronous process code saving unit 703 to manage the asynchronous process code.

TABLE 3

Asynchronous Process Code Management Table

| ID | FILENAME | FILE DATA |
|---|---|---|
| 1 | asyncproc1.zip | <binary data> |
| 2 | asyncproc2.zip | <binary data> |

In Table 3, the "ID" column is a column that holds a value uniquely identifying the asynchronous process code saved by the asynchronous process code management application 700. The "filename" column is a column that holds a value of a filename of the asynchronous process code saved by the asynchronous process code management application 700. The "file data" column is a column that holds binary data of the asynchronous process code saved by the asynchronous process code management application 700.

The asynchronous process code settings saving unit 704 saves execution settings of the asynchronous process code received from the client device 101 in association with the actual asynchronous process code in accordance with instructions from the asynchronous process code management unit 702. Additionally, the asynchronous process code settings saving unit 704 sends the execution settings of the asynchronous process code along with the asynchronous process code to the asynchronous process code execution management application 710 in accordance with instructions from the asynchronous process code management unit 702. The following execution environment settings table (Table 4) and event settings table (Table 5) show an example of data managed by the asynchronous process code settings saving unit 704 for the asynchronous process code execution settings.

TABLE 4

Execution Environment Settings Table

| ID | EXECUTION ENVIRONMENT TYPE | CPU | RAM | HDD |
|---|---|---|---|---|
| 1 | low | 1 GHz | 2 GB | 500 MB |
| 2 | normal | 2 GHz | 4 GB | 1 GB |
| 3 | middle | 3 GHz | 6 GB | 5 GB |
| 4 | high | 3 GHz | 8 GB | 10 GB |

In Table 4, the "ID" column is a column that holds a value by which the asynchronous process code management application 700 uniquely identifies the settings of a virtual machine environment for executing the asynchronous process code. The "execution environment type" column is a column that holds a name expressing the characteristics of the virtual machine environments for executing the asynchronous process code. The "CPU" column is a column that holds a value of the CPU in the virtual machine environment for executing the asynchronous process code. The "RAM" column is a column that holds a value of the RAM in the virtual machine environment for executing the asynchronous process code. The "HDD" column is a column that holds a size of the HDD in the virtual machine environment for executing the asynchronous process code.

TABLE 5

Event Settings Table

| ID | TARGET FILE PATH | TARGET EVENT | ASYNCHRONOUS PROCESS CODE ID | EXECUTION ENVIRONMENT ID |
|---|---|---|---|---|
| 1 | logdata/client1/ | add | 1 | 2 |
| 2 | | | 1 | 3 |
| 3 | | | 1 | 4 |
| 4 | logdata/client2/ | update | 2 | 3 |

In Table 5, the "ID" column is a column that holds a value by which the asynchronous process code management application 700 uniquely identifies an event for executing the asynchronous process code. The "target file path" column is a column that holds a target file path for executing the asynchronous process code. The "target event column" is a column that holds details of actions, executed on the file corresponding to the file path held in the "target file path" column, serving as conditions for executing the asynchronous process code. The "asynchronous process code ID" column is a column that holds the value of the "ID" column in the asynchronous process code management table corresponding to the asynchronous process code to be executed. The "execution environment ID" column is a column that holds a value of the "ID" column in the execution environment settings table corresponding to the environment for executing the asynchronous process code.

For example, when a record where the value in the "ID" column of the event settings table is 1, and a file has been "added" to a folder below "logdata/client1", this indicates that, based on the asynchronous process code management table (Table 3), asynchronous process code in "asyncproc1.zip" having an asynchronous process code ID of 1 is to be executed in an environment that, based on the execution environment settings table (Table 4), has an execution environment ID of 1, or in other words, a virtual machine environment having a 2 GHz CPU, 4 GB of RAM, and a 1 GB HDD.

The asynchronous process code execution management application 710 obtains the asynchronous process code based on the event received from the file server 102, and the execution settings thereof, from the asynchronous process code management application 700, and creates the asynchronous process code execution environment 720 for executing that asynchronous process code. The asynchronous process code execution management application 710 is constituted of a communication unit 711, an asynchronous process code execution management unit 712, an asynchronous process code execution unit 713, and an asynchronous process code execution environment management unit 714. The communication unit 711 communicates with the file server 102, the file information management server 103, the asynchronous process code management application 700, and the asynchronous process code execution environment 720 via the network device 304. The asynchronous process code execution management unit 712 receives an event from the file server 102, and asynchronous process code and execution settings from the asynchronous process code management application 700, via the communication unit 711. The asynchronous process code execution unit 713 receives the asynchronous process code and execution settings corresponding to the event received from the file server 102 in accordance with an instruction from the asynchronous process code execution management unit 712. The asynchronous process code execution unit 713 generates the asynchronous process code execution environment 720 and instructs the execution of the asynchronous process code corresponding to the event on the basis of the execution settings received from the file server 102. The asynchronous process code execution environment management unit 714 manages the state of the execution of the asynchronous process code executed in the asynchronous process code execution environment 720. The following execution environment monitored item table (Table 6) shows an example of running conditions of the asynchronous process code execution environment 720, managed by the asynchronous process code execution environment management unit 714.

TABLE 6

Execution Environment Monitored Item Table

| ID | MONITORED ITEM | MONITORED ITEM VALUE |
|---|---|---|
| 1 | retry number | 5 |
| 2 | execution time | 300 |

In Table 6, the "ID" column is a column that holds a value for uniquely identifying an item managing the running state of the asynchronous process code execution environment 720 in the asynchronous process code execution management application 710. The "monitored item" column is a column that holds an item for monitoring the state of execution of the asynchronous process code being executed by the asynchronous process code execution environment 720. The "monitored item value" column is a column that holds a threshold pertaining to the item held in the "monitored item" column. For example, a record in which the value in the "ID" column of the execution environment monitored item table is 1 means that up to five retries are allowed for the asynchronous process code executed by the asynchronous process code execution environment 720. In the case where the asynchronous process code cannot successfully complete the processing for the event even after exceeding the predetermined number of retries of 5, an error occurs in response to the retry number being exceeded, and the asynchronous process code execution management application 710 interrupts the execution of the asynchronous process code. Additionally, a record in which the value in the "ID" column of the execution environment monitored item table is 2 means that the time required by the asynchronous process code executed by the asynchronous process code execution environment 720 for processing the event is limited to 300 seconds. If no notification that the asynchronous process code has completed the processing is sent to the asynchronous process code execution management application 710 within 300 seconds, the asynchronous process code execution management application 710 sends an asynchronous process code termination instruction to the asynchronous process code execution environment 720 and interrupts the processing. Thus a variety of limitations for event-driven computing services can be defined in the execution environment monitored item table.

The asynchronous process code execution environment 720 is a virtual machine environment for executing asynchronous process code corresponding to an event sent to the asynchronous process code execution management application 710 by the file server 102, so as to process the event. The asynchronous process code execution environment 720 is provided as a cloud computing service. The hardware elements illustrated in FIG. 3 are implemented as application software by virtual machine software, and behave in the same manner as physical hardware elements. The asynchronous process code execution environment 720 is constituted of a communication unit 721 and an execution unit 722.

The communication unit 721 communicates with the file server 102, the file information management server 103, the asynchronous process code management application 700, and the asynchronous process code execution environment 720 via the network device 304. The execution unit 722 executes asynchronous process code received from the asynchronous process code management application 700 to process an event occurring in the file server 102 and received from the asynchronous process code execution management application 710 via the communication unit 721. The execution unit 722 receives a consecutive execution monitoring request from the asynchronous process code execution environment management unit 714 and receives a monitoring request pertaining to the asynchronous process code being executed from the asynchronous process code execution management application 710, and controls the execution of the asynchronous process code.

Registration of Asynchronous Process Code

Figure 9B:
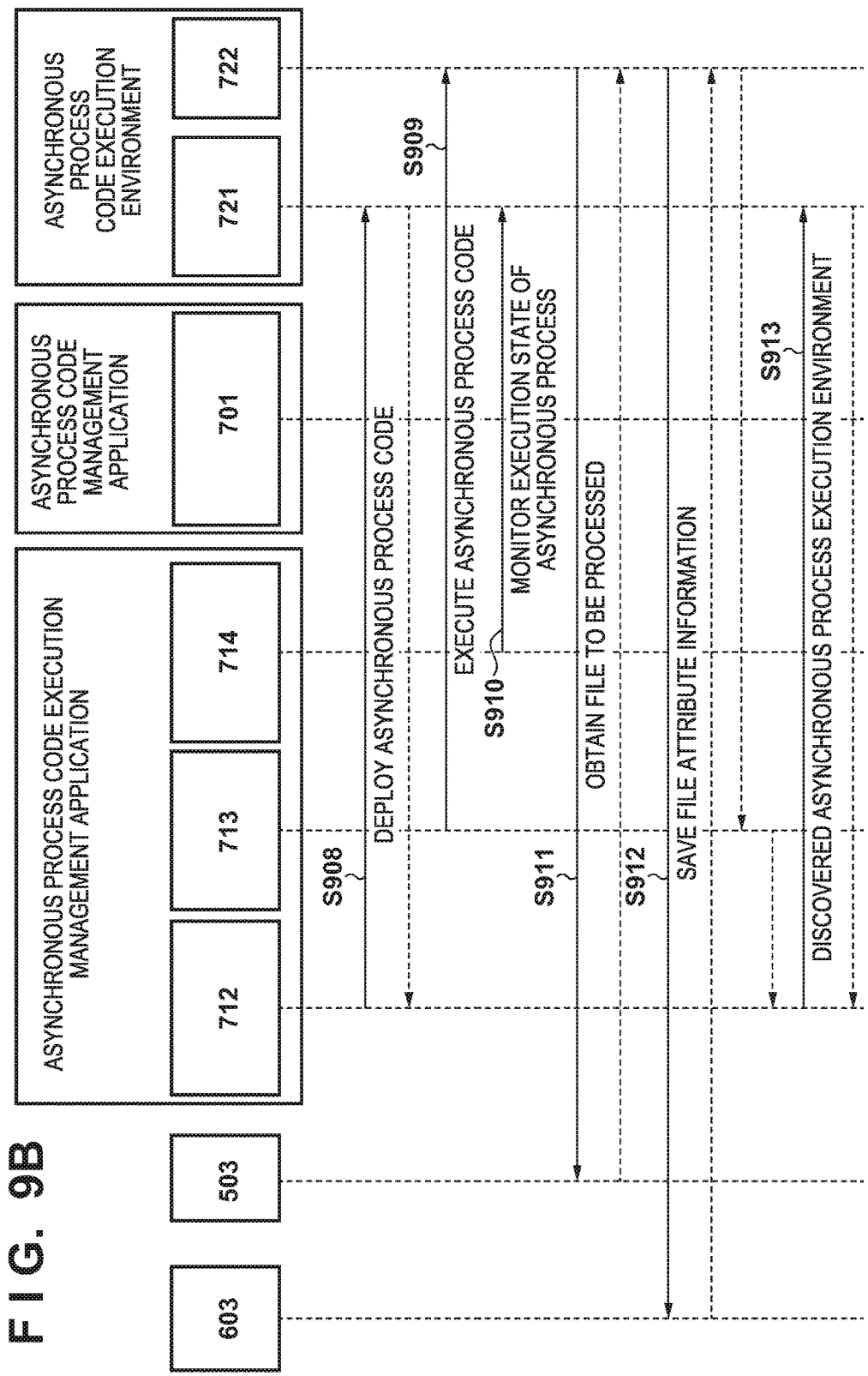

FIGS. 8, 9A, and 9B are sequence chart illustrating the flow from the registration and management of asynchronous process code in the event information management server 104 as described with reference to FIG. 7 to actually processing an event occurring in the file server 102.

FIG. 8 is a sequence chart illustrating a series of processes through which the client device 101 registers asynchronous process code in the asynchronous process code management application 700, according to this embodiment. In step S801, the client device 101 sends the asynchronous process code registration request to the asynchronous process code management application 700 via the communication unit 401. The following asynchronous process code registration request record (Table 7) shows an example of a record sent to the asynchronous process code management application 700 as the asynchronous process code registration request.

TABLE 7

Asynchronous Process Code Registration Request Record

| ASYN-CHRONOUS PROCESS CODE | ASYN-CHRONOUS PROCESS CODE FILENAME | EXE-CUTION TARGET FILE PATH | EXE-CUTION TARGET EVENT | EXE-CUTION ENVI-RONMENT ID |
|---|---|---|---|---|
| <binary data> | asyncproc1.zip | logdata/client1 | add | 2 |

The "asynchronous process code" column is a column that holds the actual asynchronous process code as binary data. The "asynchronous process code filename" column is a column that holds the filename of the asynchronous process code. The "execution target file path" column is a column that holds a file path in the file server 102 for executing the asynchronous process code. The asynchronous process code execution management application 710 refers to the file path included in the event received from the file server 102, and in the case where that path matches the path held in this column, determines that the event is an event for which the asynchronous process code is to be executed. The "execution target event" column is a column that holds an action for which the asynchronous process code is to be executed for the file held in the execution target file path in the file server 102. The "execution environment ID" column is a column that holds a value of the "ID" column in the execution environment settings table corresponding to the environment for executing the asynchronous process code. For example, the asynchronous process code registration request record shown in Table 7 means a request to register asynchronous process code executed in the case where a file has been added to a folder below logdata/client1 in the file server 102.

In step S802, the asynchronous process code execution management application 710 generates an asynchronous process code management record from the asynchronous process code registration request record received by the communication unit 701, and stores the record in the asynchronous process code management table in the asynchronous process code saving unit 703. The value of the "asynchronous process code filename" column in the asynchronous process code registration request record is held in the "filename" column of the asynchronous process code management record. The binary data in the "asynchronous process code" column of the asynchronous process code registration request record is held in the "file data" column of the asynchronous process code management record.

In step S803, the asynchronous process code execution management application 710 generates an event settings record and stores that record in the event settings table (Table 5, for example) in the asynchronous process code settings saving unit 704. The value of the execution "target file path" column of the asynchronous process code registration request record is held in the "target file path" column of the event settings record. The value of the "execution target event" column of the asynchronous process code registration request record is held in the "target event" column of the event settings record. The value in the "ID" column of the asynchronous process code management record, held in the asynchronous process code management table of the asynchronous process code saving unit 703 in step S802, is held in the "asynchronous process code ID" of the event settings record. The value of the "execution environment ID" column of the asynchronous process code registration request record is held in the "execution environment ID" column of the event settings record. The asynchronous process code is registered in the asynchronous process code execution management application 710 as a result of this series of processes.

Execution of Asynchronous Process Code

FIGS. 9A and 9B are sequence charts illustrating a series of processes in which the asynchronous process code is started and completed, according to this embodiment. Together, FIGS. 9A and 9B illustrate a single sequence. The asynchronous process code described with reference to FIGS. 9A and 9B is assumed to be started using the client device 101 newly registering a file in the file server 102 as an event, with the code executing a process for extracting attribute information of the newly-registered file and registering that information in the file management unit 502 of the file server 102. Of course, there are only examples of the event and the event-driven computing service, and another event may be used as the trigger, and another process as the service, instead.

In step S901, the client device 101 sends, to the file server 102, a file upload request for registering log information output by the information collection unit 402 as a file via the communication unit 401. The following file upload request record (Table 8) shows an example of a record sent to the file server 102 as the file upload request.

TABLE 8

File Upload Request

| FILE DATA | FILENAME | UPLOAD DESTINATION FOLDER |
|---|---|---|
| <binary data> | 201601.log | logdata/client1 |

In Table 8, the "file data" column is a column that holds binary data of the file to be sent. The "filename" column is a column that holds the name of the file to be sent. The "upload destination folder" column is a column that holds the path of the folder in the file server 102 to which the file is to be uploaded.

In step S902, the file server 102 adds the data included in the file upload request received by the communication unit 501 to the file management table of the file saving unit 503. Once the file server 102 has finished adding the data to the file saving unit 503, the file server 102 sends a response to the client device 101 via the communication unit 501, indicating that the file upload is complete.

In step S903, the file server 102 generates an event indicating that the file upload is complete, and notifies the asynchronous process code execution management application 710 of the event via the communication unit 501. The following file upload completion event (Table 9) shows an example of a record sent to the asynchronous process code execution management application 710 as the file upload completion event.

TABLE 9

File Upload Completion Event

| FILE PATH | EVENT TYPE |
|---|---|
| logdata/client1/201601.log | add |

The "file path" column in Table 9 is a column that holds the file path, in the file server 102, of the file serving as the trigger for generating the event. The "event type" column is a column that holds the details of an operation carried out on the file, in the file server 102, saved in the file path held in the "file path" column. In step S901, a file was newly uploaded from the client device 101 to the file server 102, and thus a value of "add" is entered here.

In step S904, the asynchronous process code execution management application 710 uses the asynchronous process code execution management unit 712 to confirm the details of the file upload completion event received via the communication unit 711. First, the asynchronous process code execution management unit 712 obtains the folder path, excluding the filename, from the value in the "file path" column of the file upload completion event, along with the value in the "event type" column. Next, via the communication unit 711, the asynchronous process code execution management unit 712 refers to the event settings table in the asynchronous process code settings saving unit 704 of the asynchronous process code management application 700, searches out a record in which the combination of the value in the "target file path" column and the value in the "target event" column matches the combination of the folder path and the value in the "event type" column, and if such a record is present, obtains the record. If no such record is present, it can be determines that no asynchronous processing that takes the notified event as a trigger is set. In this case, the sequence may be terminated at step S904.

However, if such a record is present, in step S905, the asynchronous process code execution management unit 712 obtains, from the asynchronous process code management application 700, the asynchronous process code corresponding to the event received in step S904, on the basis of the event settings record obtained in step S904. The asynchronous process code execution management unit 712 searches out a record matching the value in the "asynchronous process code ID" of the event settings record from the asynchronous process code management table of the asynchronous process code saving unit 703, and obtains the binary data of the asynchronous process code held in the "file data" column.

In step S906, the asynchronous process code execution management unit 712 obtains, from the asynchronous process code management application 700, the settings for executing the asynchronous process code obtained in step S905. The asynchronous process code execution management unit 712 searches out a record matching the value of the "execution environment ID" column in the event settings record from the execution environment settings table (Table 4) in the asynchronous process code saving unit 703, and obtains the record.

In step S907, the asynchronous process code execution management unit 712 creates and starts the virtual machine of the asynchronous process code execution environment 720 having the specifications based on the execution environment settings record obtained in step S906.

In step S908, the asynchronous process code execution management unit 712 deploys the asynchronous process code obtained in step S905 to the storage device 303 of the asynchronous process code execution environment 720 via the communication unit 711.

In step S909, the asynchronous process code execution unit 713 sends an asynchronous process code execution request to the execution unit 722 of the asynchronous process code execution environment 720 via the communication unit 711. Upon receiving the asynchronous process code execution request, the execution unit 722 loads the asynchronous process code received in step S908 into the RAM 302 and starts the execution of the asynchronous process code. The following asynchronous process code execution request record (Table 10) shows an example of the asynchronous process code execution request sent to the execution unit 722.

TABLE 10

Asynchronous Process Code Execution Request Record

| FILE PATH | EVENT SETTINGS ID |
|---|---|
| logdata/client1/201601.log | 1 |

In Table 10, the "file path" column is a column that holds a path in the file server 102 of the file to be processed with the asynchronous process code. The value of the "file path" column in the file upload completion event record received in step S904 is held here. The "event settings ID" column is a column that holds the value in the "ID" column of the event settings record obtained in step S904 by the asynchronous process code execution management application 710.

The execution unit 722 manages the state of the execution of the asynchronous process code being executed. The following Table 11 shows an example of an execution state record managed by the execution unit 722.

TABLE 11

Execution State Record

| STATUS | EXECUTION NUMBER | ELAPSED TIME |
|---|---|---|
| executing | 1 | 120 |

In Table 11, the "status" column is a column that holds the value of an execution status of the asynchronous process code being executed by the execution unit 722. It is conceivable that the number of values possible as the status will increase/decrease depending on the details of the processing implemented by the asynchronous process code. In this embodiment, the value is "executing" during the time from when the asynchronous process code is started to when the asynchronous process code ends. If the processing has ended normally, the value is "OK", whereas if the processing has ended with an error, the value is "error". The "execution number" column is a column that holds the number of times the execution unit 722 has executed the asynchronous process code for the event that has occurred in the file server 102. The number of times the code has been executed refers, for example, to a number of retries. The "elapsed time" column is a column that holds the amount of time elapsed from when the execution unit 722 started the execution of the asynchronous process code, in seconds, for example. The value in the "elapsed time" column is incremented while the value in the "status" column is "executing", and the incrementing is stopped when the value in the "status" column has become "OK" or "error". The value in the "elapsed time" column is reset to 0 when the value in the "status" column changes one again to "executing".

In step S910, the asynchronous process code execution environment management unit 714 executes a monitoring process that confirms the execution state of the asynchronous process started in step S909.

Figure 10:
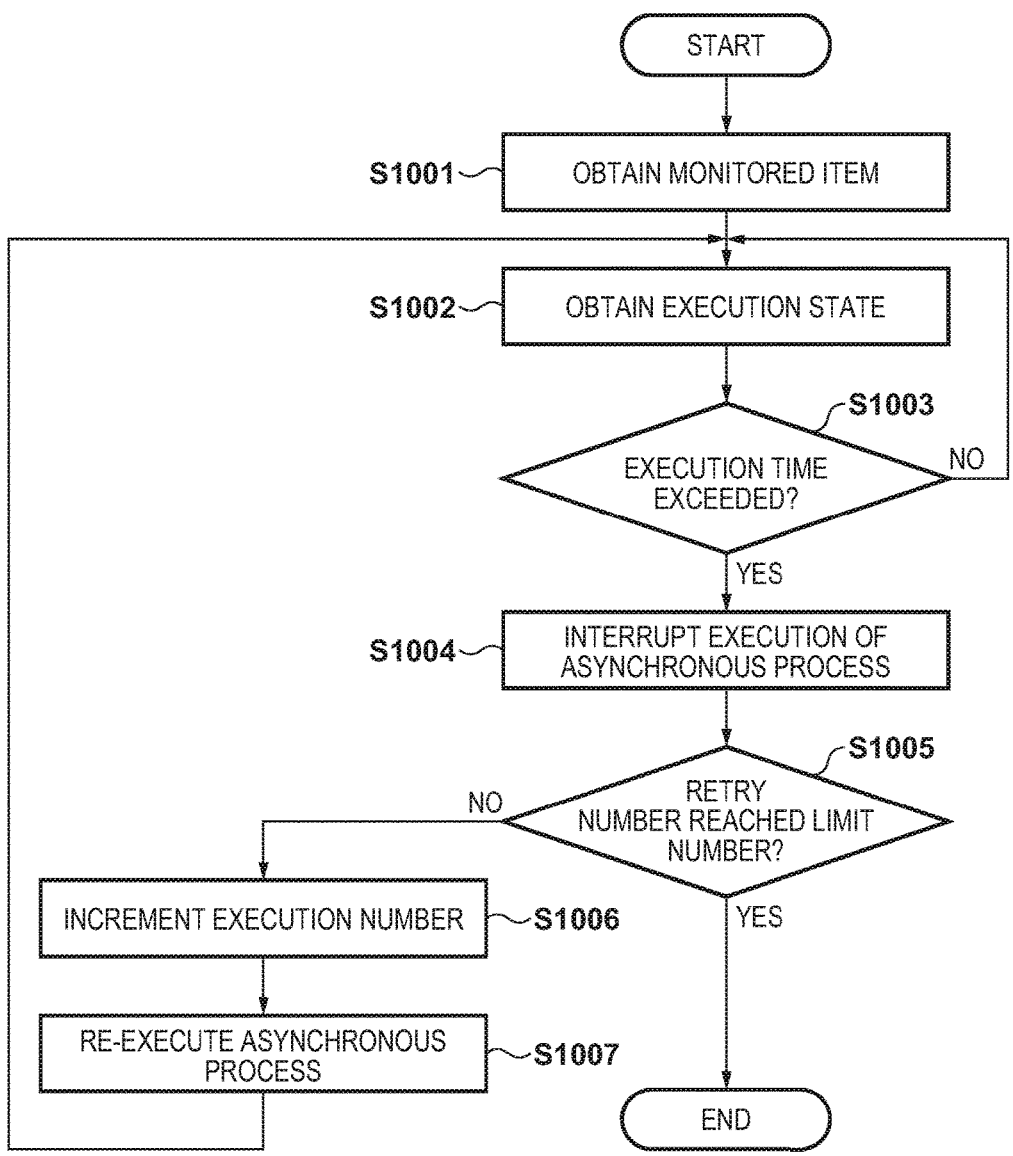
FIG. 10 is a flowchart illustrating an asynchronous process code monitoring process.

FIG. 10 is a flowchart illustrating the monitoring process executed by the asynchronous process code execution environment management unit 714 in step S910 in detail. This process is executed in parallel with the asynchronous process started in step S909, and is executed by the asynchronous process code execution environment management unit 714 until the asynchronous process ends or until the monitored item registered in the execution environment monitored item table (Table 6, for example) of the asynchronous process code execution environment management unit 714 is exceeded.

In step S1001, the asynchronous process code execution environment management unit 714 obtains the execution environment monitored item records from the execution environment monitored item table.

In step S1002, the asynchronous process code execution environment management unit 714 obtains the execution state record of the asynchronous process code execution environment 720.

In step S1003, the asynchronous process code execution environment management unit 714 compares the value in the "elapsed time" column of the execution state record obtained in step S1002 with the value of the "monitored item value" column in the record in which the value in the "monitored item" column of the execution environment monitored item record obtained in step S1001 is "execution time". In the case where the value in the "elapsed time" column is less than the value in the "monitored item value" column, the process returns to step S1002 and the monitoring is continued. In the case where the value in the "elapsed time" column is greater than the value in the "monitored item value" column, the process advances to step S1004.

In step S1004, the asynchronous process code execution environment management unit 714 interrupts the process executed by the asynchronous process code execution environment 720.

In step S1005, the asynchronous process code execution environment management unit 714 compares the value in the "execution number" column of the execution state record obtained in step S1002 with the value of the "monitored item value" column in the record in which the value in the "monitored item" column of the execution environment monitored item record obtained in step S1001 is "retry number". In the case where the value in the "execution number" column is less than the value in the "monitored item value" column, the process advances to step S1006. In the case where the value in the "execution number" column matches the value in the "monitored item value" column, the monitoring process ends.

In step S1006, the asynchronous process code execution environment management unit 714 adds 1 to the value in the "execution number" column of the execution state record of the asynchronous process code execution environment 720.

In step S1007, the asynchronous process code execution environment management unit 714 re-executes the asynchronous process code.

Through this series of processes, the asynchronous process code in the asynchronous process code execution environment 720 is monitored so as to be executed without exceeding a limit value set by the asynchronous process code execution management application 710. In the case where it is determined in step S1005 that the retry number has reached the limit value, the processing sequence is ended at that time without any further retries. If, rather than in this step, the sequence illustrated in FIGS. 9A and 9B is ended without the asynchronous process code being executed or with the asynchronous process code being interrupted, that information may be recorded in the execution log. Note also that although steps S911 and S912 are denoted as being executed after step S910 in FIG. 9B, this is simply to make the drawing easier to understand. Step S911 and step S912 are steps carried out by executing the asynchronous process code, and implement processing based on the details of the asynchronous process code. The monitoring carried out in step S910 is repeated, periodically for example, during the execution of the asynchronous process code.

In step S911, the execution unit 722 obtains, from the file server 102, the file corresponding to the file path in the asynchronous process code execution request record received in step S909.

In step S912, the execution unit 722 extracts the attribute information from the file obtained in step S911, generates a file attribute information record, and registers the record in the file information management table in the file information saving unit 603 of the file server 102. When the asynchronous process code ends normally, the execution unit 722 sends a notification of the code ending to the asynchronous process code execution management unit 712.

When the execution of the asynchronous process code ends, in step S913, the asynchronous process code execution management unit 712 shuts down and discards the virtual machine of the asynchronous process code execution environment 720.

Avoiding Failures Caused by Limitations on Asynchronous Process Code

Each time an event arises in the file server 102 due to the series of processes illustrated in FIGS. 8, 9A, 9B, and 10, the asynchronous process code corresponding to the event is executed as appropriate in the event information management server 104. However, depending on the details of the event, there are cases where the processing of the asynchronous process code is interrupted without the process ending within the limitations of the execution environment monitored item set by the asynchronous process code execution management application 710. For example, in this embodiment, there are cases where a file uploaded by the client device 101 to the file server 102 is large, and the specs of the CPU, the RAM, and the HDD assigned as the execution environment for the asynchronous process code executed in correspondence with that file are not suitable. In this case, even if the asynchronous process code execution management application 710 executes the asynchronous process code, the execution time will be exceeded in step S1003 and the restart of the asynchronous process in step S1007 will be repeated until the limit value is reached, which results in the processing being interrupted.

Asynchronous Process Code in the Embodiment

Figure 11:
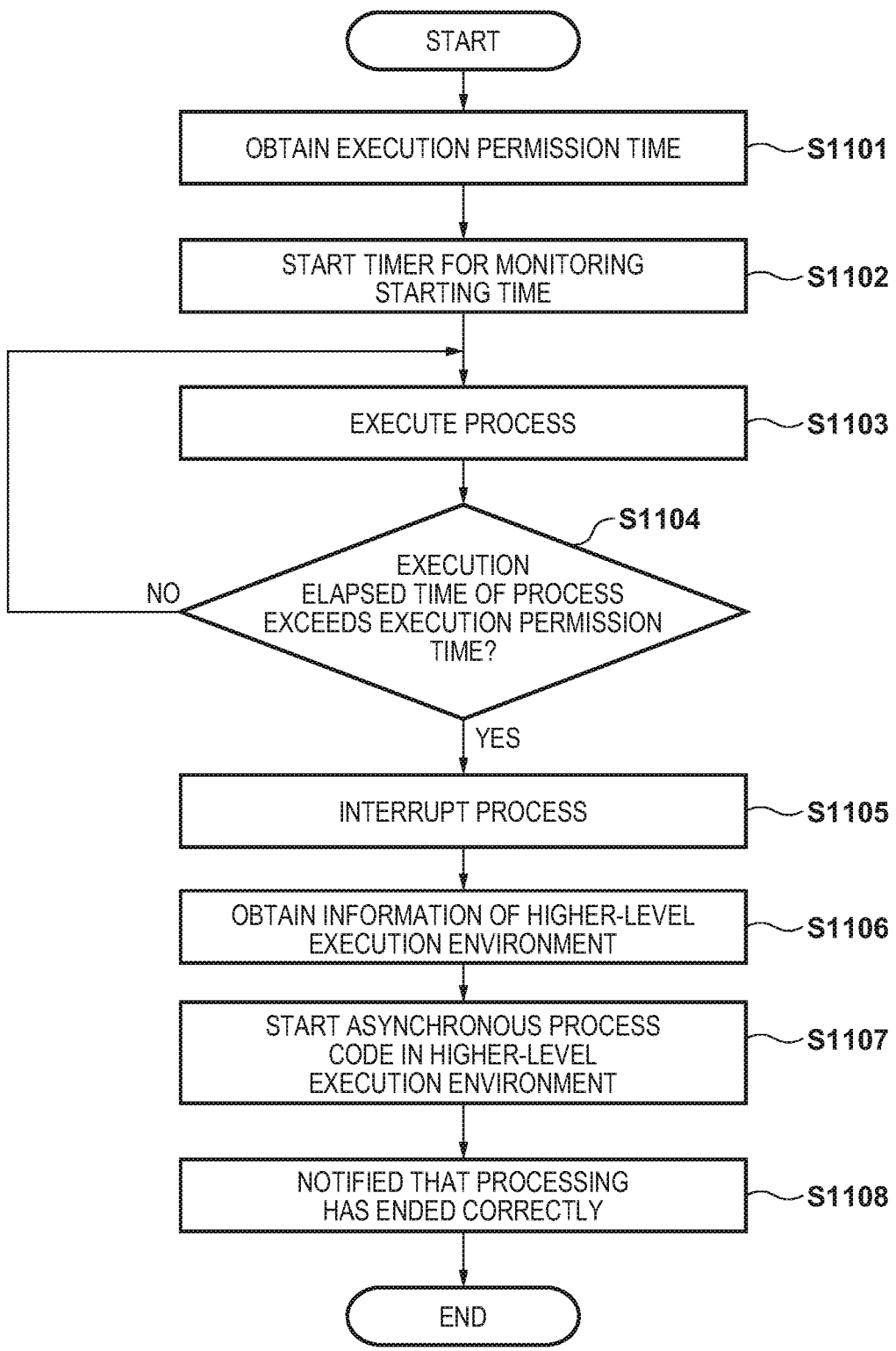
FIG. 11 is a flowchart illustrating a process through which asynchronous process code starts asynchronous processing code in a different execution environment in accordance with a processing time.

FIG. 11 is a flowchart illustrating a processing sequence of the asynchronous process code that enables the execution environment of asynchronous process code corresponding to the details of an event occurring gin the file server 102 to be changed dynamically in accordance with the event, such that the processing can continue, in the case where the specifications of the execution environment have been greatly exceeded. FIG. 12 is a diagram illustrating pseudo-code of asynchronous process code executed in the flow of the flowchart indicated in FIG. 11. The asynchronous process code illustrated in FIG. 11 is executed by the execution unit 722. With respect to the hardware configuration, the code is, for example, executed by the CPU 301 that realizes the execution unit 722.

In step S1101, the asynchronous process code obtains the value of an execution permission time set in that code itself. The execution permission time can also be called an upper limit on the execution time. The asynchronous process code execution request record obtained from the asynchronous process code execution management application 710 in step S909 is also obtained at this time. This process corresponds to a pseudo-code block 1201.

In step S1102, the asynchronous process code executes a timer measuring the start time of the processing of that code. This process corresponds to a pseudo-code block 1202.

In step S1103, the asynchronous process code starts the processing of that code. In this embodiment, the file in the path indicated by the value in the "file path" column of the file upload completion event received from the file server 102 is obtained, attribute information for the file is generated, and the attribute information is registered in the file information management table. This process corresponds to a pseudo-code block 1203.

In step S1104, the asynchronous process code monitors the execution elapsed time of the processing of that code, and confirms whether or not the value of that time exceeds the execution permission time obtained in step S1101. The processing continues in the case where the execution permission time has not been exceeded. The process advances to step S1105 in the case were the result of monitoring the execution time indicates that the execution permission time has been exceeded. This process corresponds to a pseudo-code block 1204. In step S1104, it may be determined that the elapsed time exceeds the permitted time upon the timer set in step S1102 expiring, for example. Alternatively, the determination may be carried out periodically using another timer or the like while step S1103 is being executed. In the case of the former, another sequence started in response to the timer expiring may be carried out from step S1105 on, for example.

In step S1105, the asynchronous process code interrupts the processing started in step S1103.

In step S1106, the asynchronous process code obtains, from the event settings table of the asynchronous process code settings saving unit 704, the event settings record having a value that matches the value in the "event settings ID" column of the asynchronous process code execution request record obtained in step S1101, via the execution unit 722. The value of the "asynchronous process code ID" column and the value of the "execution environment ID" column are obtained from the obtained event settings record. A higher-level execution environment starting request for executing the asynchronous process code in a new, higher-level execution environment is then generated and sent to the asynchronous process code execution management application 710. This process corresponds to a pseudo-code block 1206. Table 12 shows an example of the higher-level execution environment starting request.

TABLE 12

| Higher-Level Execution Environment Starting Request | | |
|---|---|---|
| ASYNCHRONOUS PROCESS CODE ID | HIGHER-LEVEL EXECUTION ENVIRONMENT ID | FILE PATH |
| 1 | 2 | logdata/client1/ 201601.log |

In Table 12, the "asynchronous process code ID" column is a column that holds the ID of the asynchronous process code executed as illustrated in FIG. 11 in order to execute similar asynchronous process code in the new, higher-level execution environment. Specifically, this column holds the value of the "asynchronous process code ID" column of the event settings record obtained in step S1106. The "higher-level execution environment ID" column is a column that holds an environment ID of an environment for newly executing the asynchronous process code. Specifically, this column holds a value obtained by incrementing the value in the "environment ID" column of the event settings record obtained in step S1106 by 1 (that is, a value obtained by increasing the value by 1). The "file path" column is a column that holds the file path for the asynchronous process code executed in the new, higher-level execution environment. Specifically, this column holds the value of the "file path" column of the event settings record obtained in step S1106. In this example, it is desirable that the execution environment settings table (Table 4) includes a plurality of execution environment settings records having ID (environment ID) values starting from 1, for example. Is further desirable that as the value of the ID increases, the environment is capable of executing the asynchronous process code in a shorter amount of time (that is, is a higher-level environment). In step S1106, it is determined whether or not the newly-set environment ID is registered in the execution environment settings table of Table 4, and the processing may be advanced in the case where the ID is registered. In this case, if the newly-set environment ID is not registered in the execution environment settings table of Table 4, there is no higher environment; accordingly, the process may end in an error, for example, assuming that the process could not be completed within a limit time even in the environment that shortens the processing time by the greatest amount.

In step S1107, the asynchronous process code execution management application 710 receives the higher-level execution environment starting request sent from the execution unit 722 in step S1106. Then, the asynchronous process code execution management application 710 newly generates the asynchronous process code execution environment 720 in accordance with the values held in the higher-level execution environment starting request, and processes the event occurring in the file server 102.

In step S1108, the asynchronous process code sends, to the asynchronous process code execution management application 710, a notification that the process of that code has ended correctly. By the asynchronous process code sending this notification that the process has ended correctly, the asynchronous process code run in step S1103 is removed from being a target of the monitoring process illustrated in FIG. 10. As a result, a situation in which the asynchronous process code run in step S1103 using the event received by the communication unit 711 in step S903 as a trigger and the asynchronous process code newly started in step S1107 are executed concurrently can be avoided. Having received the notification, the asynchronous process code execution management application 710 deletes the old asynchronous process code execution environment 720. The asynchronous process code being executed is ended after step S1108.

In this example, it is desirable that the timer value (permitted time) set in step S1102 be shorter than a time obtained by subtracting the time required from the step S1105 to step S1108 from the upper limit of the execution time checked in step S1003 of FIG. 10. This is because before the execution of the asynchronous process is interrupted in step S1004 of FIG. 10, the steps from step S1105 to step S1108 are executed and a different asynchronous process is started.

The asynchronous process code newly started in this manner is the same as the asynchronous process code started thereby, and thus in the case where the execution time exceeds the permitted time, other asynchronous process code can furthermore be started and carry out processing. The execution environment has higher specifications with each start, and thus is an environment where the processing is easier to complete.

Note that re-starting processing means that the current process will be executed concurrently therewith. However, if the asynchronous process indicates saving information extracted from the file associated with the event (attribute information, for example), for example, a situation in which the file is saved in duplicate can be avoided by saving files pertaining to the same event in the same save location and with the same name.

Through the above-describe sequence of processes, even in the case where an asynchronous process (that is, a script) started and executed automatically in response to the first system event that has been detected cannot complete processing in that asynchronous process code execution environment 720, an asynchronous process code execution environment having higher specifications is newly launched before the asynchronous process code ends in an error, and the asynchronous process code continues in an environment suited to the event. Accordingly, the execution environment optimal for the event can be dynamically assigned to the asynchronous process code, and thus the event processing can be completed reliably.

In this embodiment, the asynchronous process executed using an event as a trigger (a script, for example) calls the same script instead of an execution environment enabling faster processing. However, rather than changing the execution environment, asynchronous process code called separately from the asynchronous process may be different code than the code itself on the calling side. In this case, the newly-started asynchronous process code is more efficient code. To that end, it is also possible for the details of the process to be changed, such as removing items from the information to be saved as a file, or saving the information as-is without any alterations. Furthermore, both the environment of the asynchronous process and the asynchronous process code that is started may be different from the asynchronous process code on the calling side. In this case, the asynchronous process code is registered in association with the location where the data that is the target of the event-driven processing is held, but the other asynchronous process code started from the asynchronous process code being executed may be registered without such an association being established. This can also be applied in the second embodiment described below.

Second Embodiment

In the first embodiment, the execution elapsed time of the asynchronous process code started in response to the event received by the communication unit 711 in step S903 is monitored, and in the case where there is a risk that that time will exceed the execution time set by the asynchronous process code execution management application 710, the execution environment of the asynchronous process code is switched to an environment having higher specifications. This enables the event processing to be completed reliably. However, this embodiment describes a method in which in the case where there is a risk that the event processing by the asynchronous process code will exceed the retry number set by the asynchronous process code execution management application 710, an indication that this will occur is detected in advance, and the execution environment of the asynchronous process code is switched to a higher-specification environment. This enables the event processing to be completed reliably.

Figure 13:
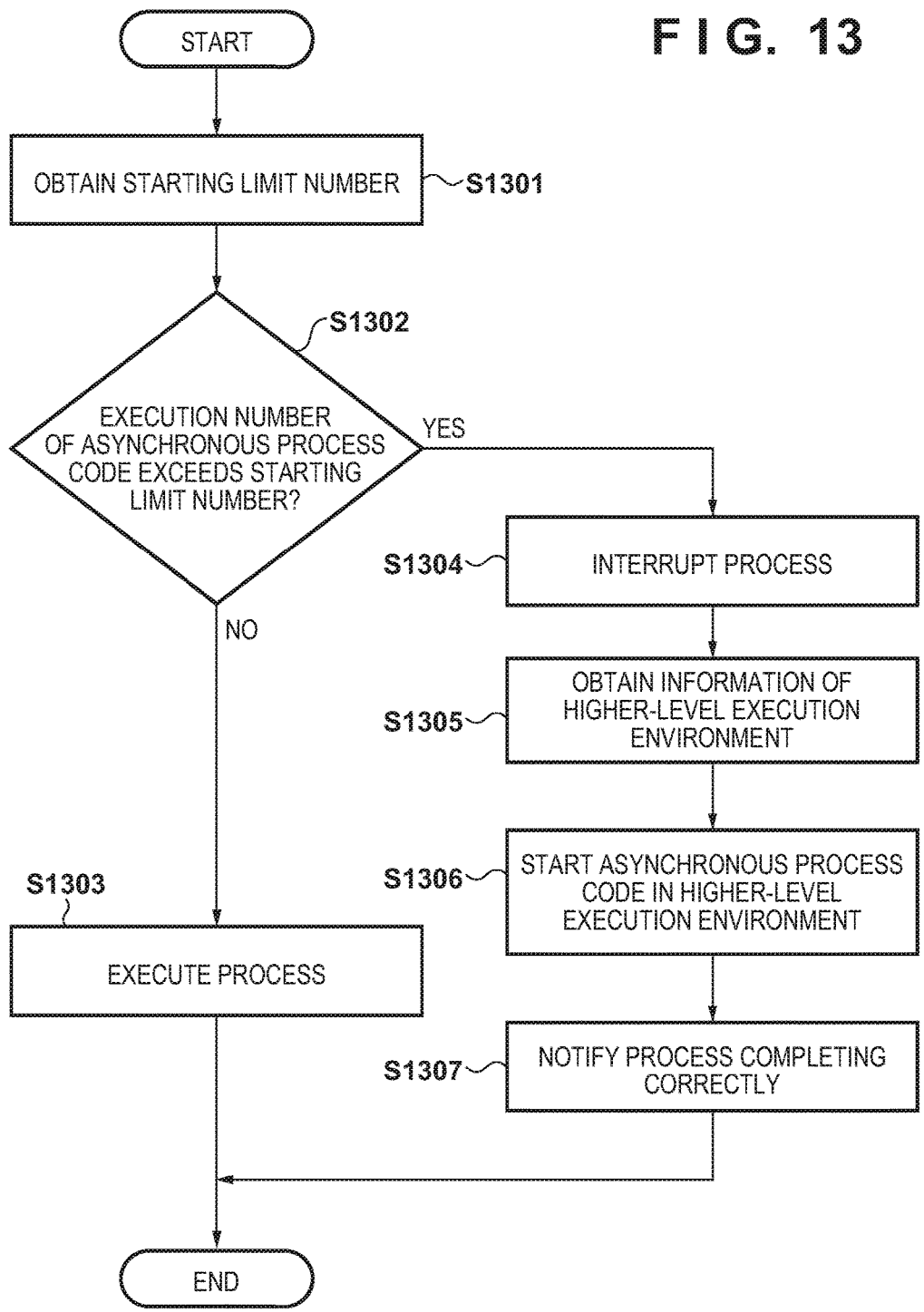
FIG. 13 is a flowchart illustrating a process through which asynchronous process code starts asynchronous process code in a different execution environment in accordance with a process number.

FIG. 13 is a flowchart illustrating a sequence of processing of the asynchronous process code. In the case where the details of the event occurring in the file server 102 greatly exceed the specifications of the execution environment of asynchronous process code, an indication that this will occur is detected on the basis of the retry number of the asynchronous process code. In the case were such an indication is detected, the processing can be continued by dynamically changing the execution environment in accordance with the event. FIG. 14 is a diagram illustrating pseudo-code of asynchronous process code executed in the flow of the flowchart indicated in FIG. 13.

In step S1301, the asynchronous process code refers to an asynchronous process code starting limit table in the file information management unit 602 of the file information management server 103, and obtains a starting limit number indicating the number of times the asynchronous process code can be executed for the same event. This process corresponds to a pseudo-code block 1401. The following asynchronous process code starting limit table (Table 13)

shows an example of the data held in the asynchronous process code starting limit table.

TABLE 13

Asynchronous Process Code Starting Limit Table

| ASYNCHRONOUS PROCESS CODE ID | STARTING LIMIT NUMBER |
|---|---|
| 1 | 4 |

The "asynchronous process code ID" column is a column that holds the value of the "ID" column in the asynchronous process code management table (Table 3, for example). The "starting limit number" column is a column that holds a limit value for the number of times the asynchronous process code can be started for the same event. This value is set to be lower than the value in the "monitored item value" column in the record for which the value in the "monitored item" column of the execution environment monitored item table (Table 6, for example) managed by the asynchronous process code execution environment management unit 714 is "retry number".

In step S1302, the asynchronous process code refers to the value in the "execution number" column of the execution state record managed by the execution unit 722, and confirms the execution number of that asynchronous process code itself with respect to the event received by the communication unit 711 in step S903. This process corresponds to a pseudo-code block 1402. The asynchronous process code then compares the value in the "starting limit number" column obtained in step S1301 with the value in the "execution number" column obtained in step S1302; the process advances to step S1303 in the case where the value in the "execution number" column is lower than the value in the "starting limit number" column, and advances to step S1304 when such is not the case. This process corresponds to a pseudo-code block 1403.

In step S1303, the asynchronous process code starts the processing of that code. At this time, the value in the "execution number" column of the execution state record managed by the execution unit 722 is incremented by 1 and updated. In this embodiment, the file in the path indicated by the value in the "file path" column of the file upload completion event received from the file server 102 is obtained, attribute information for the file is generated, and the attribute information is registered in the file information management table. This process corresponds to a pseudo-code block 1404. Note that in the case where the process started here times out, a retry process is carried out automatically in the same execution environment (is started again from S1301).

In step S1304, the asynchronous process code interrupts the substantive processing of that code. The asynchronous process itself is continued. At this stage, no substantive processing is being carried out, and thus step S1304 may be skipped. The series of processes from step S1305 to step S1307 is the same as the processes from step S1106 to step S1108 in FIG. 11, and thus descriptions thereof will be omitted.

According to the above-described sequence of processing, before the asynchronous process code in the asynchronous process code execution environment 720 started upon an event first being received reaches the limit value of the retry number set by the asynchronous process code execution management application 710, an asynchronous process code execution environment having higher specifications is newly started, and the asynchronous process code is continued in an environment suited to the event. Accordingly, the execution environment optimal for the event can be dynamically assigned to the asynchronous process code, and thus the event processing can be completed reliably.

Third Embodiment

In the first and second embodiments, it is assumed that the asynchronous process code executed in common and the execution environment thereof are first assigned for an event. Here, indicators that the event processing will be unable to be completed in the assumed execution environment are detected in advance, and the execution environment of the asynchronous process code is switched to an environment having higher specifications so that the event processing can be completed reliably. However, this embodiment describes a method in which the details of an event are confirmed before the execution environment is generated for that event, and an execution environment suited to an event corresponding to specific conditions is generated from the beginning so that the event processing can be completed reliably.

Figure 15:
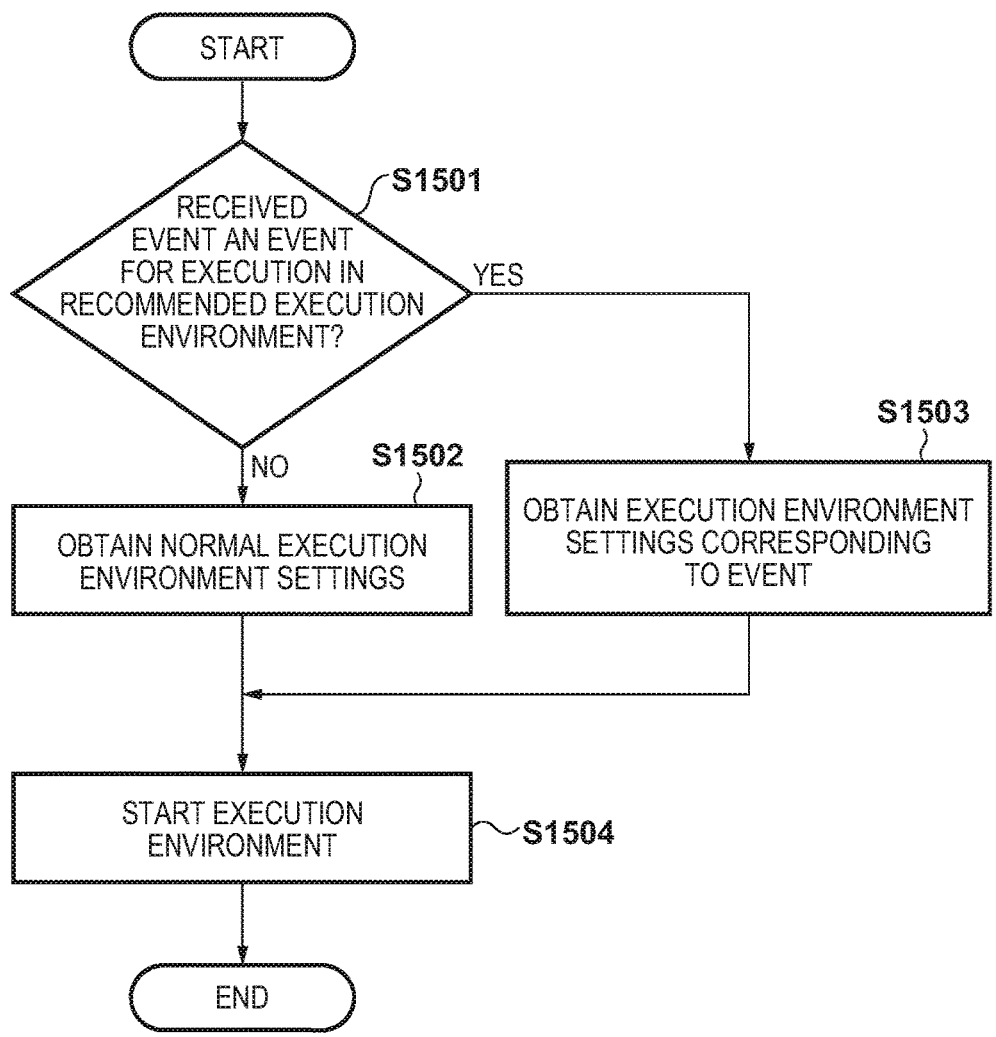
FIG. 15 is a flowchart illustrating a process that determines an environment for executing asynchronous process code depending on the details of an event.

FIG. 15 is a flowchart illustrating a series of processes in which, when the asynchronous process code execution management unit 712 constructs the execution environment of the asynchronous process code in step S907 of FIG. 9A, the details of the event are judged and an execution environment suited thereto is generated.

In step S1501, the asynchronous process code execution management unit 712 refers to an extended event settings record obtained from the asynchronous process code settings saving unit 704 of the asynchronous process code management application 700. The following extended event settings table (Table 14) shows an example of the extended event settings record.

TABLE 14

Extended Event Settings Table

| ID | TARGET FILE PATH | TARGET EVENT | ASYNCHRONOUS PROCESS CODE ID | EXECUTION ENVIRONMENT ID | CONDITION ID |
|---|---|---|---|---|---|
| 1 | logdata/client1/ | add | 1 | 2 | 1 |
| 2 | | | 1 | 3 | |
| 3 | | | 1 | 4 | |
| 4 | logdata/client2/ | update | 2 | 3 | |

The extended event settings record shown in Table 14 is a record in which information for implementing the method according to this embodiment has been added to the records of the event settings table according to the first and second embodiments (Table 5, for example). The "ID" column is a column that holds a value by which the asynchronous process code management application 700 uniquely identifies an event for executing the asynchronous process code. The "target file path" column is a column that holds a target file path for executing the asynchronous process code. The "target event column" is a column that holds details of actions, executed on the file corresponding to the file path held in the "target file path" column, serving as conditions for executing the asynchronous process code. The "asynchronous process code ID" column is a column that holds the value of the "ID" column in the asynchronous process code management table corresponding to the asynchronous process code to be executed. The "execution environment ID" column is a column that holds a value of the "ID" column in the execution environment settings table corresponding to the environment for executing the asynchronous process code. The "condition ID" column is a column that holds an ID for, in the case where different candidates for execution environments are present depending on the details of the target event, uniquely identifying a conditions record from a conditions table. The following conditions table (Table 15) shows an example of the data in the conditions record.

TABLE 15

Conditions Table

| CONDITION ID | RECOMMENDED EXECUTION ENVIRONMENT ID | CONDITION ITEM | CONDITION VALUE |
| --- | --- | --- | --- |
| 1 | 3 | file size | 2048 KB or more |

In Table 15, the "condition ID" column is a column that holds a value uniquely identifying the conditions record in the asynchronous process code management application 700. The "recommended execution environment ID" column is a column that holds the value in the "ID" column of the execution environment settings table corresponding to an execution environment that is recommended when executing the asynchronous process code on the basis of the event. The "condition item" column is a column that holds the item name of a condition for permitting the asynchronous process code to be executed in execution environment settings corresponding to the value of the recommended "execution environment ID" column. The "condition value" column is a column that holds a specific condition value corresponding to the value in the "condition item" column. The example of the record shown in Table 15 means that in the case where the file size of the file corresponding to the received event is greater than or equal to 2048 KB, the corresponding asynchronous process code is executed in the environment for which the value in the "ID" column of the execution environment settings table is 3.

In step S1501, the asynchronous process code execution management unit 712 refers to the value in the "condition ID" column of the extended event settings record shown in Table 14, and if a value is set, obtains the conditions record corresponding to that value from the asynchronous process code settings saving unit 704. Then, the asynchronous process code execution management unit 712 obtains, from the file management table of the file saving unit 503, the file size in the file information corresponding to the value in the "target file path" column of the extended event settings record. Finally, the obtained file size is compared with the value in the "condition value" column of the conditions record, and the process advances to step S1503 in the case where the conditions indicated in the conditions record are met. The process advances to step S1502 in the case where the conditions are not met.

In step S1502, the asynchronous process code execution management unit 712 refers to the value in the "execution environment ID" column of the extended event settings record, and obtains a record in which the value in the "ID" column of the execution environment settings table matches.

In step S1503, the asynchronous process code execution management unit 712 refers to the value in the "recommended execution environment ID" column of the conditions record for which the conditions have been met, and obtains a record in which the value in the "ID" column of the execution environment settings table matches.

In step S1504, the asynchronous process code execution management unit 712 generates the execution environment 720 in accordance with the value in the execution environment settings record obtained in step S1502 or step S1503.

According to the sequence of processing described above, an execution environment suited to the processing for an event is generated from the beginning, and thus the event processing can be completed reliably.

Other Embodiments

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-208847, filed Oct. 25, 2016 which is hereby incorporated by reference herein in its entirety.

What is claimed is:

1. A non-transitory computer-readable medium storing a first program therein executed by a computer constituting a system, the first program causing a computer to execute an information processing method comprising:

processing data using computing resources registered in association with the first program, in accordance with detection of a system event registered in association with the first program;

interrupting the processing of the data in accordance with a result of monitoring an amount of time taken to execute the first program, and starting a second program registered in the system so that the data is processed, wherein the system event indicates that the data to be processed has been stored in a predetermined storage location, and wherein the second program is registered without being associated with the predetermined storage location.

2. The non-transitory computer-readable medium according to claim 1, wherein the amount of time taken to execute the first program includes one of an amount of time elapsed from when the first program is executed, a remaining amount of time permitted for the execution of the first program, and a remaining amount of time at which it is determined that the second program is to be started.

3. The non-transitory computer-readable medium according to claim 1, wherein the processing is interrupted in response to the amount of time elapsed from when the first program is executed exceeding a limit time; and the second program is started before the amount of time elapsed from when the first program is executed exceeds the limit time.

4. The non-transitory computer-readable medium according to claim 1, wherein the second program is started in the case where a number of retries carried out in response to the execution time of the first program exceeding a limit time has exceeded a predetermined number.

5. The non-transitory computer-readable medium according to claim 1, wherein more computing resources are assigned to the second program than to the first program.

6. The non-transitory computer-readable medium according to claim 1, wherein the second program processes the same data as the first program.

7. The non-transitory computer-readable medium according to claim 1, wherein the second program has the same code as the first program.

8. A system that provides a service that executes a first script, the system comprising:

at least one processor; and at least one memory storing instructions, wherein, upon execution of the stored instructions, the at least one processor functions as:

a detection unit configured to detect a system event;

a processing unit configured to process data using computing resources registered in association with a first script in accordance with detection of the system event;

a monitoring unit configured to monitor an amount of time taken to execute the first script; and an execution unit configured to interrupt the processing of the data in accordance with a result of monitoring the amount of time taken to execute the first script, and start a second script registered in the system so that the data is processed, wherein the system event indicates that the data to be processed has been stored in a predetermined storage location, and wherein the second script is registered without being associated with the predetermined storage location.

9. The system according to claim 8, wherein the amount of time taken to execute the first script includes one of an amount of time elapsed from when the first script is executed, a remaining amount of time permitted for the execution of the first script, and a remaining amount of time at which it is determined that the second script is to be started.

10. The system according to claim 8, wherein the processing is interrupted in response to the amount of time elapsed from when the first script is executed exceeding a limit time; and the execution unit starts the second script before the amount of time elapsed from when the first script is executed exceeds the limit time.

11. The system according to claim 8, wherein the execution unit executes the second script registered in the system in the case where a number of retries carried out in response to the execution time of the first script exceeding the limit time has exceeded a predetermined number; and the data being processed by the processing unit is processed as a result of the second script.

12. The system according to claim 8, wherein the second script has the same code as the first script; and more computing resources are assigned to the second script than to the first script.

13. The system according to claim 8, wherein the second script processes the same data as the first script.

14. An information processing method in a system that provides a service that executes a first script, the method comprising:

detecting a system event;

processing data using computing resources registered in association with a first script in accordance with detection of the system event;

monitoring an amount of time taken to execute the first script; and interrupting the processing of the data and executing a second script registered in the system so that the data is processed, in accordance with a result of monitoring the amount of time taken to execute the first script, wherein the system event indicates that the data to be processed has been stored in a predetermined storage location, and wherein the second script is registered without being associated with the predetermined storage location.

* * * * *